United States Patent
Baltrucki

(10) Patent No.: US 11,261,805 B2
(45) Date of Patent: Mar. 1, 2022

(54) SYSTEMS HAVING DEACTIVATOR CONTROLLER OPERATIVELY CONNECTED TO DEACTIVATORS FOR AT LEAST TWO CYLINDERS AND METHODS FOR CYLINDER DEACTIVATION

(71) Applicant: Jacobs Vehicle Systems, Inc., Bloomfield, CT (US)

(72) Inventor: Justin D. Baltrucki, Canton, CT (US)

(73) Assignee: JACOBS VEHICLE SYSTEMS, INC., Bloomfield, CT (US)

( * ) Notice: Subject to any disclaimer, the term of this patent is extended or adjusted under 35 U.S.C. 154(b) by 0 days.

(21) Appl. No.: 16/947,239

(22) Filed: Jul. 24, 2020

(65) Prior Publication Data
US 2021/0025341 A1 Jan. 28, 2021

Related U.S. Application Data

(60) Provisional application No. 62/878,017, filed on Jul. 24, 2019.

(51) Int. Cl.
*F02D 13/06* (2006.01)
*F02D 13/02* (2006.01)
*F02D 41/00* (2006.01)

(52) U.S. Cl.
CPC ......... *F02D 13/06* (2013.01); *F02D 13/0215* (2013.01); *F02D 41/0087* (2013.01);
(Continued)

(58) Field of Classification Search
CPC .. F02D 13/06; F02D 13/0215; F02D 41/0087; F02D 2200/024; F02D 2200/101; F02D 2200/023
(Continued)

(56) References Cited

U.S. PATENT DOCUMENTS 5,490,486 A * 2/1996 Diggs ................ F01L 13/0005
123/198 F
7,302,921 B2 * 12/2007 McDonald ............ F01L 1/146
123/90.12
(Continued)

FOREIGN PATENT DOCUMENTS

JP 2017025760 A 2/2017
JP 2017172457 A 9/2017

OTHER PUBLICATIONS

International Search Report for International App. No. PCT/IB202/057035 dated Sep. 15, 2020, 3 pages.
(Continued)

*Primary Examiner* — Hai H Huynh
(74) *Attorney, Agent, or Firm* — Moreno IP Law LLC

(57) ABSTRACT

In an embodiment, an internal combustion engine comprises a plurality of cylinders, each of the plurality of cylinders comprising at least one intake deactivator operatively connected to at least one intake valve and at least one exhaust deactivator operatively connected to at least one exhaust. An intake deactivator controller is operatively connected to the intake deactivators associated with at least two cylinders of the plurality of cylinders, and an exhaust deactivator controller is operatively connected to the exhaust deactivators associated with the at least two cylinders. In another embodiment, only a single deactivator controller is operatively connected to both the intake deactivators and to the exhaust deactivators associated with the at least two cylinders of the plurality of cylinders.

48 Claims, 16 Drawing Sheets

(52) U.S. Cl.
CPC .. *F02D 2200/023* (2013.01); *F02D 2200/024* (2013.01); *F02D 2200/101* (2013.01)

(58) Field of Classification Search
USPC .................. 123/320, 325, 198 F, 90.15, 481; 701/112
See application file for complete search history.

(56) References Cited

U.S. PATENT DOCUMENTS

| | | | |
|---|---|---|---|
| 7,490,001 B2* | 2/2009 | Izelfanane | F02D 13/06 701/105 |
| 9,790,824 B2 | 10/2017 | Baltrucki et al. | |
| 10,563,549 B2* | 2/2020 | McCarthy, Jr. | F02D 41/0087 |
| 10,823,029 B2* | 11/2020 | Chen | F01N 3/2033 |
| 2002/0189575 A1* | 12/2002 | Rayl | F02D 17/02 123/198 F |
| 2008/0017151 A1 | 1/2008 | Kusaka et al. | |
| 2019/0040772 A1 | 2/2019 | Lilly et al. | |
| 2020/0011257 A1* | 1/2020 | Stretch | F02D 41/0255 |

OTHER PUBLICATIONS

Written Opinion of the International Searching Authority for International App. No. PCT/IB202/057035 dated Sep. 15, 2020, 4 pages.

* cited by examiner

|  | TEMPERATURE | | | | |
|---|---|---|---|---|---|
| PRESSURE | 70 | 104 | 140 | 180 | 212 |
| 1 | 0.044444 | 0.0461 | 0.023889 | 0.027222 | 0.023889 |
| 1.5 | 0.027111 | 0.025 | 0.0223 | 0.019667 | 0.017778 |
| 2 | 0.023483 | 0.0203 | 0.017222 | 0.017778 | 0.016667 |
| 3 | 0.018878 | 0.017222 | 0.015 | 0.014939 | 0.014933 |

US 11,261,805 B2

SYSTEMS HAVING DEACTIVATOR CONTROLLER OPERATIVELY CONNECTED TO DEACTIVATORS FOR AT LEAST TWO CYLINDERS AND METHODS FOR CYLINDER DEACTIVATION

FIELD

The instant disclosure relates generally to cylinder deactivation for internal combustion engines and, in particular, to the control of cylinder deactivation in a system having one or more deactivator controllers operatively connected to deactivators associated with at least two cylinders.

BACKGROUND

FIG. 1 is a partial schematic illustration of an internal combustion engine 100 including a cross-sectional view of an engine cylinder 102 and related valve actuation systems in accordance with the instant disclosure. Although a single cylinder 102 is illustrated in FIG. 1, this is only for ease of illustration and it is appreciated that internal combustion engines often include multiple such cylinders driving a crankshaft (not shown). The engine cylinder 102 has disposed therein a piston 104 that reciprocates upward and downward repeatedly during both positive power operation (i.e., combustion of fuel to drive the piston 104 and the drivetrain) and engine braking operation (i.e., use of the piston 104 to achieve air compression and absorb power through the drivetrain) of the cylinder 102. At the top of each cylinder 102, there may be at least one intake valve 106 and at least one exhaust valve 108. The intake valve(s) 106 and the exhaust valve(s) 108 are opened and closed to provide communication with an intake gas passage 110 and an exhaust gas passage 112, respectively. Valve actuation forces to open the intake valve 106 and exhaust valve 108 are conveyed by respective valve trains 114, 116. In turn, such valve actuation forces (illustrated by the dashed arrows) may be provided by respective main and/or auxiliary motion sources 118, 120, 122, 124 such as rotating cams. As used herein, the descriptor "main" refers to so-called main event engine valve motions, i.e., valve motions used during positive power generation, whereas the descriptor "auxiliary" refers to other engine valve motions for purpose other than positive power generation (e.g., compression release braking, bleeder braking, cylinder decompression, brake gas recirculation (BGR), etc.) or in addition to positive power generation (e.g., internal exhaust gas recirculation (IEGR), variable valve actuations (VVA), Miller/Atkinson cycle, swirl control, etc.).

The valve trains 114, 116 may include any number of mechanical, hydraulic, hydro-mechanical, electromagnetic, or other type of valve train elements known in the art. For example, each of the valve trains 114, 116 may include one or more cam followers, push tubes, rocker arms, valve bridges, etc. used to transfer valve actuation motion to the valves 106, 108. Additionally, one or more lost motion components may be included in either or both valve trains 114, 116 whereby some or all of the valve actuation motions typically conveyed by the valve trains 114, 116 are prevented from reaching the valves 106, 108, i.e., they are "lost." A particular function employing such lost motion is cylinder deactivation.

Generally, cylinder deactivation (CDA) refers to techniques for discontinuing positive power production by a cylinder in an internal combustion engine, frequently for the purpose of reducing fuel consumption. In the context of FIG. 1, lost motion components 126, 128, referred to herein as "deactivators," are provided in the respective intake and exhaust valve trains 114, 116 to effectuate cylinder deactivation. Each deactivator 130, 132 is controlled by a corresponding deactivator controller 130, 132 that, in turn, is controlled by an engine controller 134. The engine controller 134 may comprise any electronic, mechanical, hydraulic, electrohydraulic, or other type of control device for communicating with and controlling operation of the deactivator controllers 130, 132. For example, the engine controller 134 may be implemented by a microprocessor and corresponding memory storing executable instructions used to implement the required control functions, as known in the art. It is appreciated that other functionally equivalent implementations of the engine controller 134, e.g., a suitable programmed application specific integrated circuit (ASIC) or the like, may be equally employed. Further, the engine controller 134 may be linked to suitable instrumentation to obtain data (to be used in the required control functions) corresponding to various engine operating parameters such as crankshaft position, engine speed, vehicle speed, oil temperature, coolant temperature, manifold (or port) temperature, manifold (or port) pressure, cylinder temperature, cylinder pressure, particulate information, other exhaust gas parameters, driver inputs (such as requests to initiate engine braking), transmission inputs, vehicle controller inputs, engine crank angle, and various other engine and vehicle parameters known to those skilled in the art. Likewise, it is known in the art to implement such deactivators using a hydraulically-controlled component that may be switched between an active/locked/un-collapsed state where engine valve actuation are conveyed to the engine valves (sometimes referred to herein as an "activation state"), and an inactive/unlocked/collapsed state where valve actuation motions are not conveyed to the engine valves (sometimes referred to herein as a "deactivation state"), thereby effectively deactivating the corresponding cylinder.

An example of such a hydraulically-controlled component is illustrated and described in U.S. Pat. No. 9,790,824 (the "'824 patent"), which describes a locking mechanism that is normally in a locked/un-collapsed or motion-conveying state, and that switches to an unlocked/collapsed or motion-absorbing state when hydraulic fluid is applied. Further, each locking mechanism described in the '824 patent may be applied to individual engine valves (e.g., in a rocker arm actuating a single engine valve) or multiple engine valves (e.g., in a valve bridge used to actuate two or more engine valves). Whey hydraulically-controlled deactivators are employed, the deactivator controller 130, 132 is typically implemented using a solenoid controlling flow of hydraulic fluid (e.g., motor oil) to the hydraulically-controlled deactivator.

Significantly, the deactivators 126, 128 associated either with intake valve or exhaust valves are typically controlled by a corresponding deactivator controller 130, 132 associated with a single cylinder, i.e., there is a one-to-one correspondence between deactivators controllers and cylinders. (Note that, in some systems, only a single deactivator controller is provided for both the intake and exhaust deactivators for a given cylinder. However, even in this case, the one-to-one correspondence of the deactivator controllers to cylinders is maintained.) For example, as shown in FIG. 1, the intake deactivator controller 130 operatively connected to the one or more intake-related deactivators 126 and the exhaust deactivator controller 132 operatively connected to the one or more intake-related deactivators 128 are each dedicated to the single cylinder 102 shown. Individual control of each type of deactivator (intake or exhaust) on a per cylinder basis is desirable in order to manage transient behavior when providing cylinder deactivation in a particular cylinder sequence to either trap gasses (not to be confused with fuel) in a given cylinder, or to prevent trapped gasses in such cylinder depending on the problem being addressed by cylinder deactivation. (Such trapping of gasses or vacuums in deactivated cylinders may be desirable depending on the capabilities of a particular internal combustion engine.) For example, in order to trap gas in a deactivated cylinder, deactivation of main exhaust events should be effectuated after a main intake valve event occurs, followed by deactivation of subsequent main intake valve events for the duration of the deactivation state. In this manner, gases are introduced into the cylinder prior to deactivation of all valve events. On the other hand, in order to trap a vacuum in a deactivated cylinder, the process is reversed; that is, deactivation of main intake event should be effectuated after a main exhaust valve event occurs, followed by deactivation of subsequent main exhaust valve events for the duration of the deactivation state. In this manner, gasses are expelled from the cylinder prior to deactivation of all valve events.

The strategy of one-to-one correspondence between deactivator controllers and cylinders requires a large quantity of costly control components (e.g., solenoids) and wiring that may not package well beneath an engine valve cover. For example, FIG. 2 very schematically illustrates a inline engine comprising six cylinders 202. In keeping with the one-to-one strategy, each cylinder 202 in this case has associated therewith a deactivator controller 204 operatively connected to the intake and exhaust deactivators for the given cylinder, thereby resulting in a total of six deactivator controllers.

Further complicating matters, engine braking systems used on heavy duty diesel engines often require additional control components (such as solenoids) for activation of engine brake valve motion. For example, engine braking of the so-called "1.5 stroke" type requires elimination of exhaust main event valve actuations in combination with application of engine braking valve actuations. Prior art systems for implementing such 1.5 stroke engine braking is disclosed in U.S. Patent Application Publication No. 2019/0040772 (the "'772 application"), which utilizes a solenoid for collapse of the exhaust motion (independent of intake motions) and an additional solenoid to activate the braking motion. Consequently, addition of cylinder deactivation to a system of the type described in the '772 application to a six cylinder engine with 1.5 stroke engine braking would require 12 deactivator controllers for main event deactivation, and at least one additional controller (solenoid) for engine brake control. Furthermore, two controllers are often preferred for engine brake control (e.g., in a six cylinder engine, one engine brake controller corresponding to cylinders one through three, and another engine brake controller corresponding to cylinders four through six) to provide fast response time and the ability to provide partial brake power levels for low power demands. This is illustrated in FIG. 3 showing a similar inline-six engine 300 comprising a first cylinder group 302 (comprising the first through third cylinders) and a second cylinder group 304 (comprising the fourth through sixth cylinders). As further shown, each cylinder group 302, 304 has associated therewith an engine braking controller 306, 308, resulting in a total of 14 controllers to provide 1.5 stroke engine braking and cylinder deactivation. This is not only costly, but often impossible to package on an engine given tight space constraints beneath the engine valve cover.

Thus, cylinder deactivation techniques that overcome the above-noted shortcomings would represent a welcome addition to the art.

SUMMARY

In an embodiment, the instant disclosure describes an internal combustion engine comprising a plurality of cylinders, each of the plurality of cylinders comprising at least one intake valve and at least one exhaust valve. A plurality of intake deactivators are associated with the plurality of cylinders, wherein, for each cylinder of the plurality of cylinders, at least one intake deactivator of the plurality of intake deactivators is operatively connected to the at least one intake valve and controllable to operate in either an intake activation state, in which actuation of the at least one intake valve is permitted, or an intake deactivation state in which actuation of the at least one intake valve is not permitted. The internal combustion engine further comprises a plurality of exhaust deactivators associated with to the plurality of cylinders, wherein, for each cylinder of the plurality of cylinders, at least one exhaust deactivator of the plurality of exhaust deactivators is operatively connected to the at least one exhaust valve and controllable to operate in either an exhaust activation state in which actuation of the at least one exhaust valve is permitted or an exhaust deactivation state in which actuation of the at least one exhaust valve is not permitted. An intake deactivator controller is operatively connected to the intake deactivators associated with at least two cylinders of the plurality of cylinders, and an exhaust deactivator controller operatively connected to the exhaust deactivators associated with the at least two cylinders.

Each of the plurality of intake deactivators and exhaust deactivators may comprise hydraulically-controlled deactivators, in which case the deactivator controller and the exhaust deactivator controller may each comprise a solenoid controlling hydraulic fluid.

The internal combustion engine may include an engine controller configured to operate the intake deactivator controller to place the intake deactivators associated with the at least two cylinders in the intake deactivation state, and to operate the exhaust deactivator controller to place the exhaust deactivators associated with the at least two cylinders in the exhaust deactivation state. Operation of the intake deactivator controller and the exhaust deactivation controller by the engine controller may occur substantially simultaneously. Alternatively, the engine controller can operate the intake deactivator controller to place the intake deactivators in the intake deactivation state and then subsequently operate the exhaust deactivator controller to place the exhaust deactivators in the exhaust deactivation state, or vice versa. Such subsequent operation when placing the intake or exhaust deactivators in their respective deactivation states may be based on completion of period of time or an angular range of a crankshaft or both. Either the period of time or the angular range of the crankshaft or both may be based on at least one of engine speed, oil temperature, coolant temperature or oil pressure. The engine controller may also be configured to operate the exhaust deactivator controller to place the exhaust deactivators in the exhaust activation state, and to subsequently operate the intake deactivator controller to control the intake deactivators to discontinue operating in the intake deactivation state, or vice versa. Such subsequent operation when placing the intake or exhaust deactivators in their respective activation states may be based on an angular range of a crankshaft.

In a particular embodiment, an inline engine has six cylinders, in which, during positive power operation, the plurality of cylinders are repeatedly fired in order of the first cylinder, then the fifth cylinder, then the third cylinder, then the sixth cylinder, then the second cylinder and then the fourth cylinder. In this embodiment, the intake deactivator controller is operatively connected to the intake deactivators for a first cylinder group comprising the first through third cylinders or for a second cylinder group comprising the fourth through sixth cylinders, and the exhaust deactivator controller is operatively connected to the exhaust deactivators for the first cylinder group or for the second cylinder group. The engine controller in this embodiment is configured to operate the exhaust deactivator controller such that a main exhaust event for a selected cylinder in the first cylinder group or the second cylinder group is not lost and to place the exhaust deactivators for the first cylinder group or the second cylinder group in the exhaust deactivation state. Further, the engine controller in this embodiment is configured to operate the intake deactivator controller such that a main intake event for the selected cylinder in the first cylinder group or the second cylinder group is not lost and to place the intake deactivators for the first cylinder group or the second cylinder group in the intake deactivation state.

In another embodiment, the instant disclosure describes an internal combustion engine comprising a plurality of cylinders, each of the plurality of cylinders comprising at least one intake valve and at least one exhaust valve. A plurality of intake deactivators are associated with the plurality of cylinders, wherein, for each cylinder of the plurality of cylinders, at least one intake deactivator of the plurality of intake deactivators is operatively connected to the at least one intake valve and controllable to operate in either an intake activation state in which actuation of the at least one intake valve is permitted or an intake deactivation state in which actuation of the at least one intake valve is not permitted. The internal combustion engine further comprises a plurality of exhaust deactivators associated with to the plurality of cylinders, wherein, for each cylinder of the plurality of cylinders, at least one exhaust deactivator of the plurality of exhaust deactivators is operatively connected to the at least one exhaust valve and controllable to operate in either an exhaust activation state in which actuation of the at least one exhaust valve is permitted or an exhaust deactivation state in which actuation of the at least one exhaust valve is not permitted. A deactivator controller is operatively connected to the intake deactivators and to the exhaust deactivators associated with at least two cylinders of the plurality of cylinders. Further, an engine controller is provided and configured to operate the deactivator controller, based on an angular range of a crankshaft, to place the at least two intake deactivators in the intake deactivation state and the at least two exhaust deactivators in the exhaust deactivation state. The engine controller may also be configured to operate the deactivator controller such that a main exhaust event for a selected cylinder of the at least two cylinders is not lost and that a main intake event for the selected cylinder is lost. Further still, the engine controller may be configured to operate the deactivator controller to place the intake deactivators associated with the at least two cylinders in the intake activation state and the at least two exhaust deactivators associated with the at least two cylinders in the exhaust activation state, and such that main exhaust events for unselected cylinders (i.e., those cylinders of the at least two cylinders other than the selected cylinder) occur prior to intake events for the unselected cylinders.

Corresponding methods are also described herein.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

Before describing specific systems and method in accordance with the instant disclosure, greater understanding may be provided through illustration of various "windows" concepts used herein. While it is understood that deactivators and deactivator controllers described herein may be implemented in various manners provided that they carry out the functionality described below, the remainder of the instant disclosure presumes that the deactivators and deactivator controllers are implemented as hydraulically-controlled deactivators and solenoids as described above.

With that in mind, as used herein, an unlocking/collapsing window or a locking/un-collapsing window denotes a specific crankshaft angle range in which it is desired to achieve the actual unlocked/collapsed state or locked/un-collapsed of state, respectively, of a given deactivator. As known in the art, valve actuation motions and other timing-related engine operating functions may be described in terms of crankshaft angle, which is not dependent upon engine operating speed (e.g., rotations per minute (RPM). Typically, a full engine cycle (including exhaust, intake, compression and expansion phases) are described relative to two full rotations (i.e., 720 degrees) of a crankshaft, and this convention is generally adopted in the instant disclosure. Further, as used herein, an angular range of a crankshaft (or variants thereof) is understood to include not only ranges of crankshaft angles in which an operation is permitted and sought to be achieved, but may also include ranges of crankshaft angles in which the operation is inhibited and to be avoided.

Such unlocking/collapsing or locking/un-collapsing windows are to be distinguished from deactivator controller energizing windows, which account for response times required to switch between deactivator controller operating modes. For example, in the case of solenoid-based deactivator controllers, a solenoid energizing window or solenoid de-energizing window respectively refers to the response time of the solenoid and associated hydraulic system to generate sufficient hydraulic fluid pressure at a given deactivator to begin the desired unlocking/collapsing, or the response time to depressurize the deactivator to effectuate a desired locking/un-collapsing. In other words, a solenoid energizing/de-energizing window denotes how much time must be accounted for in order to achieve a desired unlocking/collapsing or locking/un-collapsing window. Additionally, the instant disclosure makes reference to periods of time that may be used to sequence operation of deactivator controllers/deactivators and that may be used, though not preferred, in addition to or as replacement for angular ranges of a crankshaft.

Figure 4:
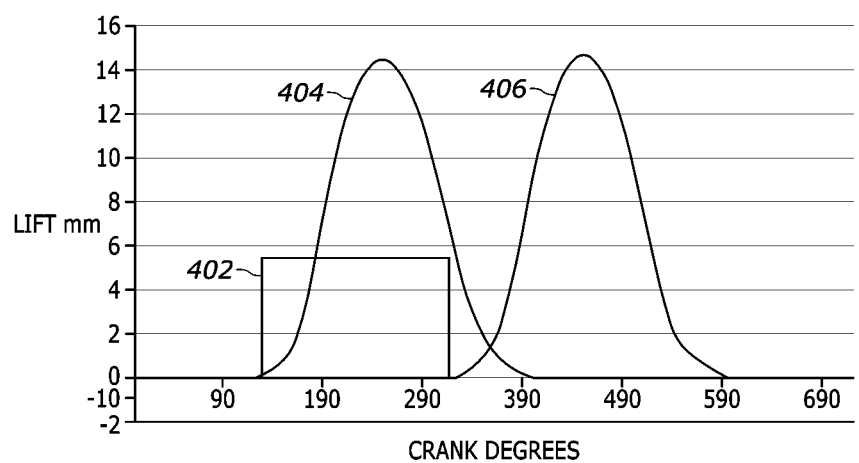
FIGS. 4-8 illustrate various examples of windows for the deactivation and activation of cylinders that may be implemented in accordance with the instant disclosure.

FIGS. 4-8 illustrate various examples of these concepts. For example, FIG. 4 illustrates a desired collapsing window 402 for both intake and exhaust deactivators that will permit occurrence of a main exhaust event 404 prior to deactivation of subsequent main exhaust events, and that will not permit occurrence of a main intake event 406 for this cycle. Throughout the remainder of this disclosure, it is assumed that a collapsing window beginning after the start of a valve event will not result in the loss of that valve event and, on the other hand, that an un-collapsing window beginning after the start of a valve event will not result in un-collapsing/relocking such that the valve event is actually conveyed to the engine valve. (In the context of the locking mechanism described in the '824 patent, this is because main event loading placed on the locking mechanism will prevent switching from the locked to the unlocked state until such time that the locking mechanism is once again unloaded and, in the opposite scenario, re-locking likewise cannot occur until the locking mechanism is once again in an unloaded state.) Thus, because the collapsing window 402 begins just after initiation of the main exhaust event 404, the main exhaust event 404 is not lost through deactivation. However, because the window 402 occurs and ends before the beginning of main intake event 406, the main intake event will collapse (i.e., be lost) for this engine cycle and subsequent engine cycles, at which time the main exhaust event 404 will also be collapsed. Consequently, this collapsing window effectively empties the cylinder of any residual gasses prior to disabling all valve motion, i.e., the deactivated cylinder will have captured a vacuum. As known in the art, capturing vacuum in a cylinder in this manner will reduce friction in the cylinder during peak compression (at top-dead-center (TDC)). Many diesel engines have piston rings that are not engineered to function with vacuum and the presence of such a vacuum can result in excessive lubrication oil leakage into the cylinder, which oil can then burn in the cylinder thereby causing emissions and oil consumption problems. On the other hand, many types of gasoline engines do not have such oil consumption problems and instead benefit from the presence of a vacuum that reduces cylinder the friction.

Figure 5:
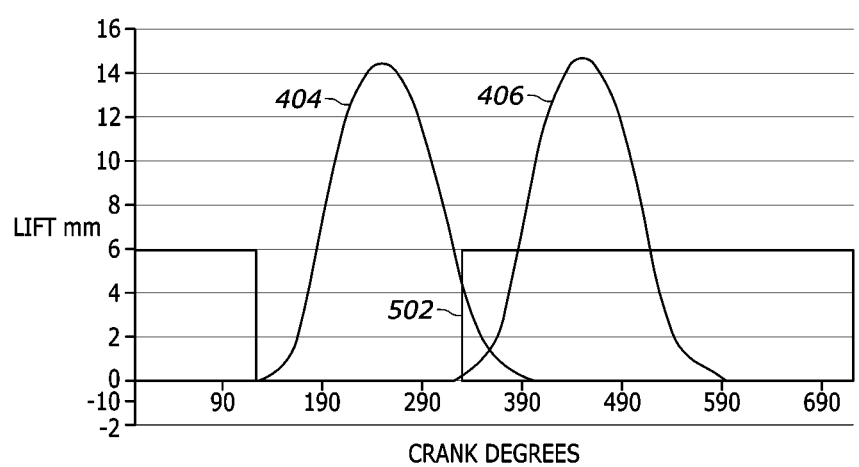

In contrast to FIG. 4, FIG. 5 illustrates a desired collapsing window 502 for both intake and exhaust deactivators that will permit occurrence of the main intake event 406 prior to deactivation of subsequent main intake events, and that will also result in the loss of subsequent main exhaust events 404 beginning with the next engine cycle. Because the main intake event 406 permits entry of gas into the cylinder, and because the main exhaust event 404 is collapsed in the next engine cycle, the gasses in the cylinder are not evacuated, i.e., the gasses are trapped in the cylinder. In this case, peak cylinder pressures at TDC will be much higher as compared to cylinders with a trapped vacuum. While this approach will result in added cylinder friction from the higher cylinder pressures, the above-noted problems of oil consumption are avoided.

Sequencing of transitions of engine valves from a deactivation state back into an activation state are also worthy of consideration. If the intake valve actuation motions are transitioned to an activation state prior to such a transition for exhaust valve actuation motions, the intake valve(s) will open near TDC. If this occurs against comparatively high cylinder pressure (as in the case of a previously deactivated cylinder trapping gasses), a noise can be generated and undesirably high loading can occur on the intake valve train components.

Figure 6:
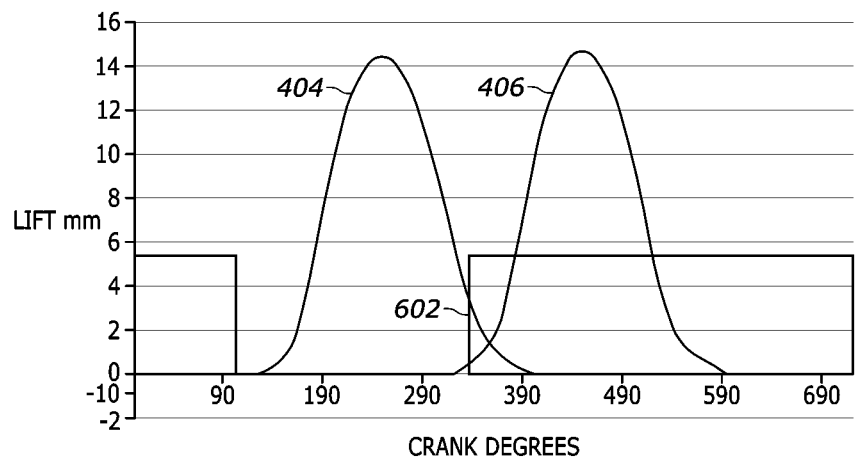

FIG. 6 illustrates an un-collapsing window 602 that will reactivate the main exhaust valve actuations prior to main intake valve actuations to ensure that the intake valve(s) do not open against high cylinder pressure resulting from trapped cylinder gasses, which is a preferred strategy to prevent occurrence of undesired noise and/or excessive intake valve train loading. Because the window 602 begins shortly after the beginning of the main intake event 406, the main intake event 406 does not occur, but the subsequent main exhaust event 404 does, thereby prevent the occurrence of higher cylinder pressures when the intake deactivator subsequently locks, thereby permitting the main intake event to open against normal pressures.

Figure 7:
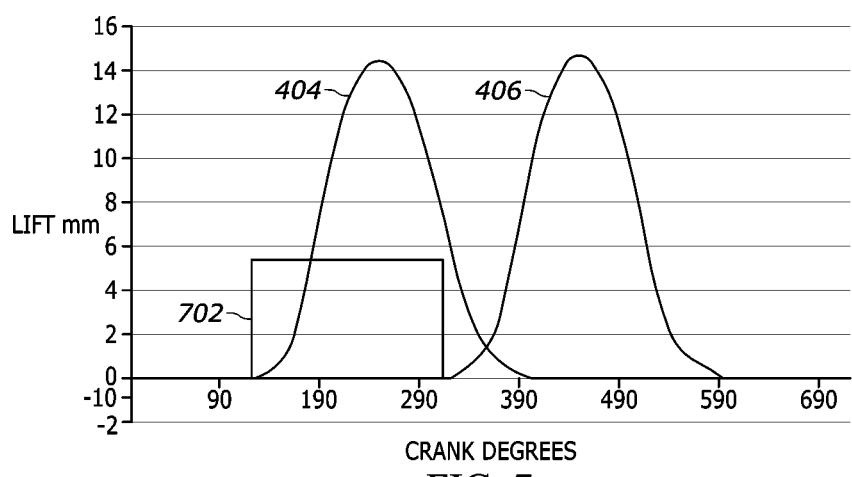

FIG. 7 illustrates an un-collapsing window 702 that begins after the main exhaust event 404 has started such that it is not possible for the exhaust to re lock. i.e., the main exhaust event 404 is lost for this engine cycle. However, because the window 702 ends before the main intake event 406 begins, the intake valve train is permitted to re-lock without having a prior main exhaust event 404, and the intake valve(s) therefore opens near TDC. As noted above, this is not the preferred strategy if a cylinder has trapped gas. However, if a cylinder does not have trapped gas, this may be an acceptable operating condition that is preferred as described further below.

Figure 1:
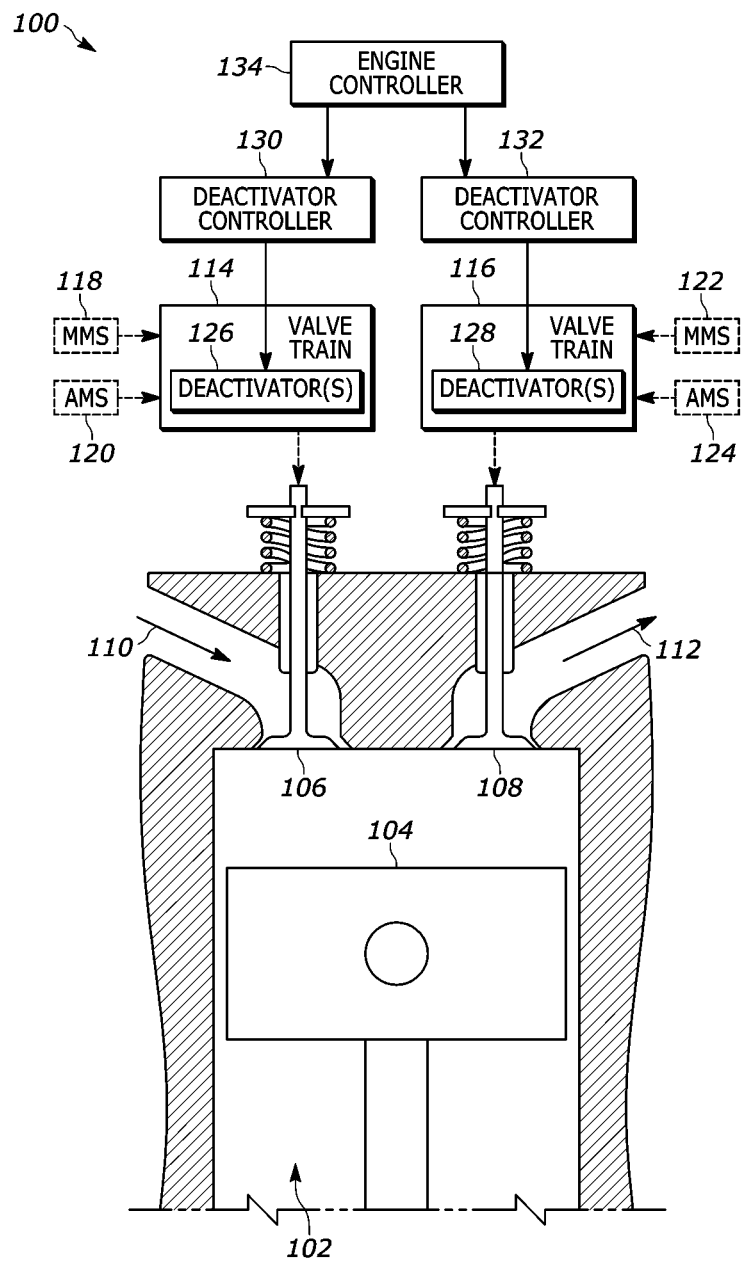
FIG. 1 is a schematic, partial cross-sectional illustration of an internal combustion engine illustrating typical deployment of deactivators and deactivator controllers in accordance with prior art techniques.
Figure 2:
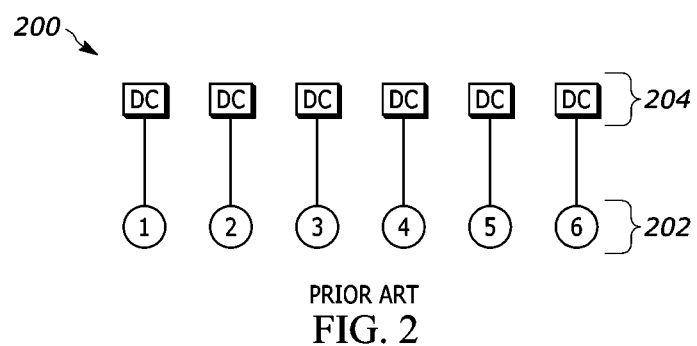
FIGS. 2 and 3 are illustrations of the numbers of required deactivator controllers and/or engine brake controllers in accordance with prior art techniques.
Figure 3:
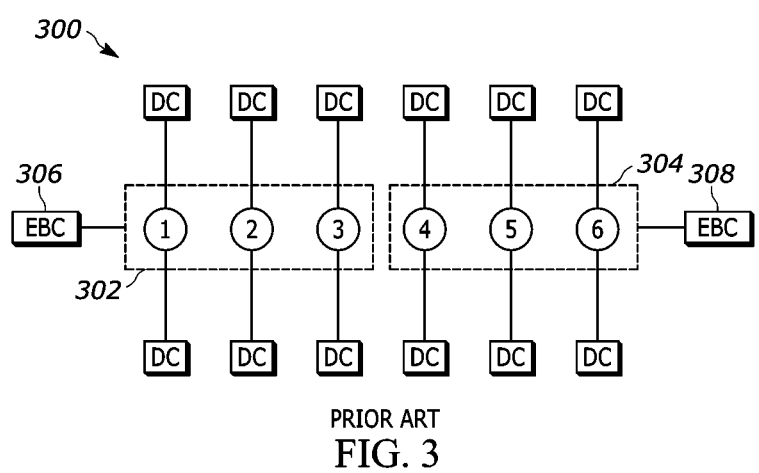

For systems that have a solenoid for every cylinder (e.g., FIGS. 2 and 3), solenoid energizing and de-energizing windows can be timed such that the collapsing and un-collapsing windows, respectively, occur within desired crankshaft angular ranges. For cold oil operation, such as at engine startup, it may be more challenging to achieve these windows as the solenoid must respond (with reference to FIG. 5) in a window 502 having a roughly 540 degree duration to achieve a trapped gas strategy. If the solenoid response time is slower than the 540 degree window, the solenoid may need to be energized and de-energized with hydraulic response times taken into account to allow more time for activation/deactivation.

Figure 8:
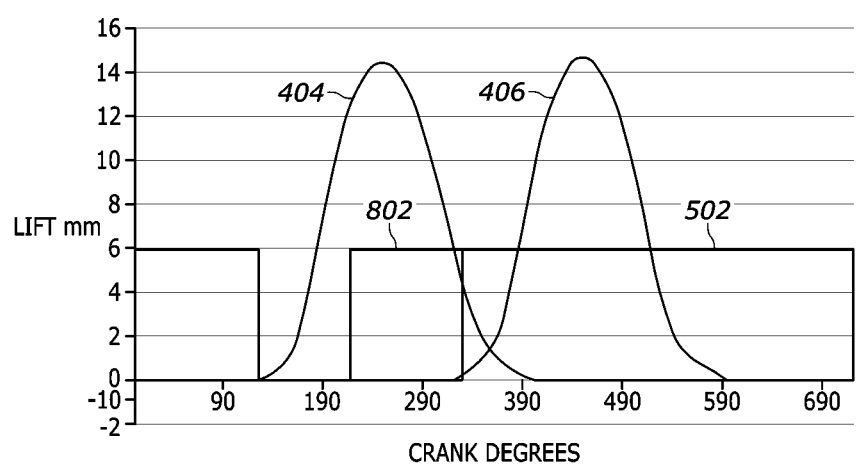

An example of this is illustrated in FIG. 8, which illustrates the collapsing window 502 with the addition of a solenoid energizing window 802 to account for hydraulic delays. In the illustrated example, the deactivation window 502 will be met if the required solenoid is energized (thereby permitting flow of hydraulic fluid) at the beginning of the energizing window 802. Once again, the length of the energizing window 802 is based on the anticipated delay resulting from the solenoid response time to open the flow of hydraulic fluid, and the viscosity of the hydraulic fluid flowing through the solenoid and required hydraulic passages. As will be appreciate by those skilled in the art, the duration of the solenoid energizing window 802 is dependent upon on engine speed because solenoid and hydraulic delays will vary in the crank angle domain. For example, higher engine speeds will cover a relatively large angle window for a given solenoid and/or hydraulic delay, and the energizing event must be advanced (made to occur earlier) to compensate for the longer time to initiate the deactivation window 502. Furthermore, higher engine speeds also typically have a higher oil pressure and lower oil viscosity, which would need to be taken into account to compensate for the resulting faster pressure rise time by retarding (made to occur later) onset of the solenoid energizing window 802.

Figure 9:
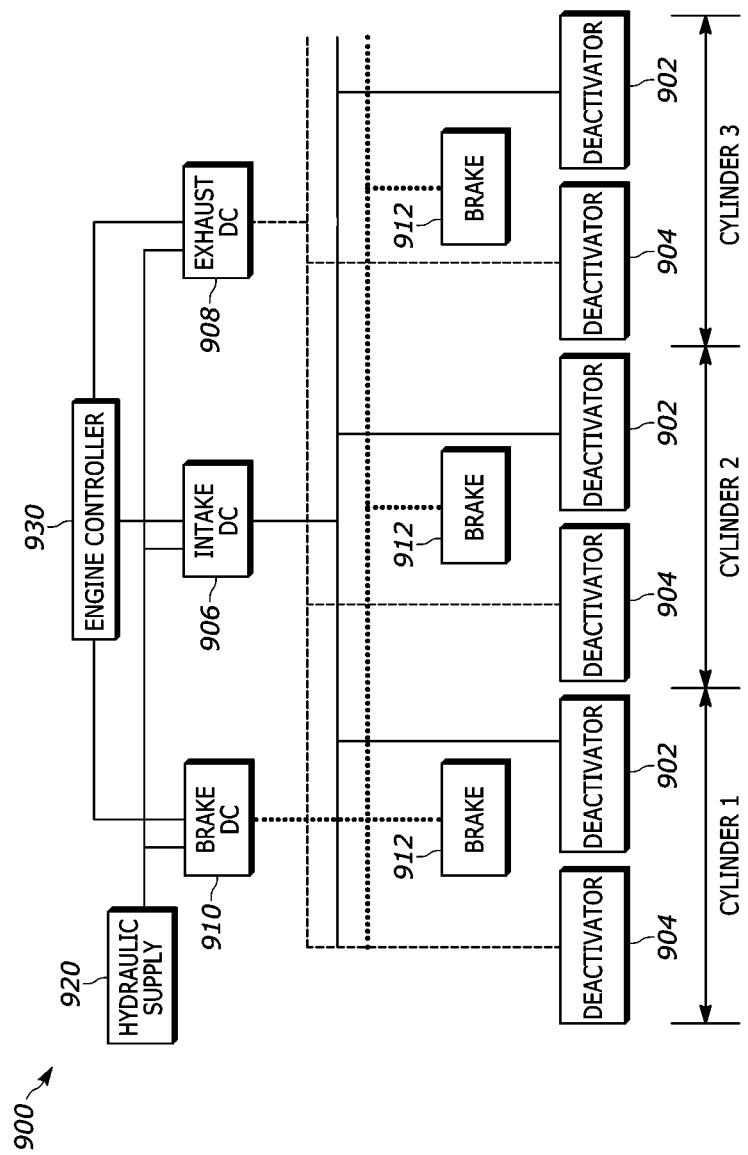
FIG. 9 is a schematic illustration of a first embodiment of an internal combustion engine in accordance with the instant disclosure.

FIG. 9 schematically illustrates an embodiment of a portion of an internal combustion engine 900 in accordance with the instant disclosure. Preferably, the various embodiments described herein relative to FIGS. 9-16 below are applicable to an inline, six cylinder internal combustion engine. However, it is appreciated that these techniques may be equally applied to internal combustion engines having differing numbers of cylinders (e.g., four cylinders, eight cylinders, etc.) and cylinder orientations (e.g., horizontally opposed, V, etc.).

In FIG. 9, the engine 900 comprises a plurality of cylinders (only three cylinders shown, labeled cylinders 1, 2 and 3). Although three cylinders are illustrated in FIG. 9, it is understood that the configuration illustrated in FIG. 9 may be equally applied to a larger number of cylinders or replicated for a similar grouping of cylinders provided that each intake and exhaust deactivator, as described in further detail below, is associated with at least two cylinders. Each cylinder has associated therewith at least one intake deactivator 902 and at least one exhaust deactivator 904. Furthermore, the engine 900 includes an intake deactivator controller 906 operatively connected to the plurality of intake deactivators 902 corresponding to at least two cylinders, and an exhausted deactivator controller 908 operatively connected to the plurality of exhaust deactivators 904 likewise corresponding to the at least two cylinders. In the illustrated embodiment, however, the intake deactivator 906 and the exhaust deactivator 908 are configured to control the operations of the intake deactivators 902 and exhaust deactivators 904 for all three illustrated cylinders, where the hydraulic connections between the intake deactivator controller 906 and the intake deactivators 902 are illustrated by the solid lines and the hydraulic connections to between the exhaust deactivator controller 908 and the exhaust deactivators 904 are illustrated by the dashed lines. Each deactivator controller 906, 908 is operatively connected to a hydraulic fluid supply 920 (such as an oil pump, one or more accumulators, etc. as known in the art) as well as an engine controller 930 as described previously. As known in the art, and in the case of hydraulic solenoids implementing the deactivator controllers, the engine controller 930 may provide electrical signals that cause the deactivator controllers 906, 908 to be energized/de-energized to control the flow of hydraulic fluid to the corresponding deactivators 902, 904.

Because each individual deactivator controller 906, 908 is associated with two or more cylinders, as opposed to a one-to-one correspondence between deactivator controllers and cylinders as in prior art systems, the number of deactivator controllers 906, 908 needed to effectively control cylinder deactivation operations of the engine may be significantly reduced. For example, to the extent that FIG. 9 illustrates one intake deactivator controller 906 and one exhaust deactivator controller 908 controlling deactivation operation of a first grouping of three cylinders, which configuration could be replicated for a second grouping of three cylinders in a six cylinder engine, the engine 900 of FIG. 9 would require only four deactivator controllers as opposed to the 12 deactivator controllers required by the prior art techniques illustrated in FIGS. 2 and 3. Although the provision of multiple deactivator controllers corresponding to groups of cylinders is presently preferred (due to decreased hydraulic response times and more granular control of cylinders), having only a single intake deactivator controller and a single exhaust deactivator controller for all six cylinders of a six cylinder engine could further reduced the overall number of deactivator controllers to only two.

Additionally, as shown in FIG. 9, an engine braking controller 910 may be optionally provided that is operatively connected to a plurality of optional engine braking assemblies 912. The hydraulic connections between the engine braking controller 910 and the engine braking assemblies are illustrated by the dotted lines. In this case, each of the engine braking assemblies 912 may be of a type known in the art for selectively providing engine braking operations for each cylinder such as compression-release braking (particularly 1.5-stroke compression-release braking), bleeder braking, etc. Alternatively, each of the assemblies 912 may be configured to provide other types of auxiliary valve actuation motions as known in the art. Once again, to the extent that many engine braking assemblies may be hydraulically controlled, the engine braking controller 910 may comprise a hydraulic solenoid identical in construction to the intake/exhaust deactivator controllers 906, 908. Although the engine braking controller 910 and engine braking assemblies 912 are not required, the various embodiments described herein are particularly applicable to systems including such components to the extent that the number of deactivators/controllers that need to be packaged within the engine 900 may be reduced accordingly.

As described in further detail below, the ability to sequence the collapsing/un-locking of deactivators is provided through unique strategies of controlling the separate intake and exhaust deactivator controllers 906, 908. Preferably, such strategies are based on windows or angular ranges of a crankshaft and/or, less preferably, periods of time between operations of the intake and exhaust deactivator controllers 906, 908. Transitions of deactivators 902, 904 from deactivation states back into activation states may be handled in a similar and opposite manner once again preferably based on crankshaft angular ranges, although time-based solenoid delays (periods of time) may also be used for this purpose.

Figure 10:
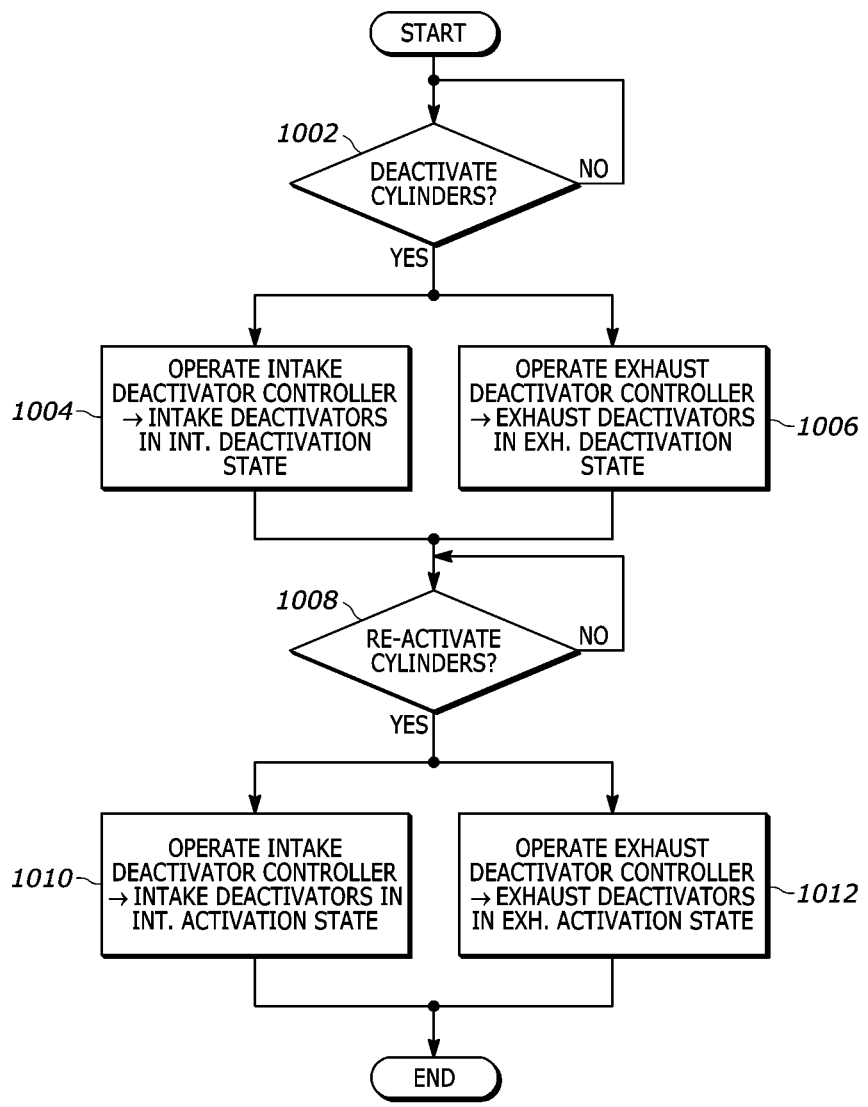
FIG. 10 is a flowchart of processing in accordance with the instant disclosure that may be implemented by the internal combustion engine of FIG. 9.

FIG. 10 illustrates a flow chart of processing for providing cylinder deactivation operation in accordance with the embodiment of FIG. 9. In an embodiment, the processing illustrated in FIG. 10 is performed by the engine controller 930 and is preferably implemented in the form of executable instructions, stored in one or more memory devices, that are executed by at least one processing device operatively connected to the memory device(s). Regardless, beginning at block 1002, a decision is made whether cylinders need to be deactivated, i.e., to place the deactivators 902, 904 in their respective deactivation states. Such a decision may be made in response to a determination that a certain set of conditions currently exist (as the case, for example, in which the engine controller determines that current vehicle speed and load provide an opportunity for reduced fuel consumption) or in response to an explicit request (as in the case, for example, of aftertreatment thermal management where it is possible to desirably increase exhaust aftertreatment temperatures through cylinder deactivation). Further, the determination to deactivate cylinders at step 1002 does not need to be conditioned on the cylinders having previously been in a positive power generation state (i.e., in an activation state). For example, it is known in the art to employ cylinder deactivation in diesel engines during cold engine startup.

Once it is determined that cylinder deactivation is required, processing continues at steps 1004 and 1006. Steps 1004 and 1006 are shown in parallel, though, in practice, these steps may be performed substantially simultaneously, or with step 1006 occurring subsequent to step 1004, or with step 1004 occurring subsequent to step 1006, as described below, in order to achieve desired operating states of deactivated cylinders. At step 1004, the engine controller operates the intake deactivator controller 906 to place the intake deactivators 902 associated with the at least two cylinders in the intake deactivation state. In the context of the examples of hydraulically-controlled deactivators and solenoids described above, this would be done by the engine controller 930 sending an appropriate signal to energize the intake deactivator solenoid 906, thereby causing hydraulic fluid to flow to the intake deactivators 902 such that they are unlocked/collapsed. Similarly, at step 1006, the engine controller operates the exhaust deactivator controller 908 to place the exhaust deactivators 904 associated with the at least two cylinders in the exhaust deactivation state. Once again, in the context of the examples of hydraulically-controlled deactivators and solenoids described above, this would be done by the engine controller 930 sending an appropriate signal to energize the intake deactivator solenoid 908, thereby causing hydraulic fluid to flow to the exhaust deactivators 904 such that they are unlocked/collapsed.

As noted above, the operations described in steps 1004 and 1006 may be permitted to occur substantially simultaneously or in an ordered fashion. In a presently preferred embodiment, such simultaneous or ordered performance of placing deactivators in their deactivation state is based on a crankshaft angular range that may be varied depending on the result to be achieved. For example, if it is desired to trap a vacuum in each of the cylinders in FIG. 9, the collapsing window 402 illustrated in FIG. 4 may be employed. More specifically, the example collapsing window 402 illustrated in FIG. 4 extends from approximately 130 degrees crank angle (but, in any case, after start of the main exhaust event 404) to approximately 320 degrees crank angle (but, in any case, before the start of the main intake event 406). Provided that respective intake and exhaust deactivator controllers 906, 908 are controlled to initiate the respective deactivation states anywhere within this window 402, the resulting deactivation states will be ordered such that intake valve actuation motions are disabled prior to exhaust valve actuation motions, thereby trapping the desired vacuum within the cylinders. On the other hand, if it is desired to trap gasses in each of the cylinders in FIG. 9, the collapsing window 502 of FIG. 5 may be employed. More specifically, the example collapsing window 502 illustrated in FIG. 4 extends from approximately 340 degrees crank angle (but, in any case, after start of the main intake event 406) to approximately 120 degrees crank angle (modulo 720 degrees; and, in any case, before the start of the main exhaust event 404). Provided that respective intake and exhaust deactivator controllers 906, 908 are controlled to initiate the respective deactivation states anywhere within this window 502, the resulting deactivation states will be ordered such that exhaust valve actuation motions are disabled prior to intake valve actuation motions, thereby trapping the desired gasses within the cylinders.

Once placed in their respective intake and exhaust deactivation states, the intake and exhaust deactivators 902, 904 will continue in this fashion for as long as the intake and exhaust deactivator controllers 906, 908 are operated by the engine controller 930 in this manner and until a switch in their operation occurs. This is reflected at step 1008 where a decision is made whether to re-activate the cylinders, i.e., to place the deactivators 902, 904 in their respective activation states. Once again, such a decision may be made in response to a determination that a certain set of conditions currently exist (such as the case in which the engine controller determines that a demand for additional engine power is required, e.g., an accelerating state; or a determination that a cold engine startup procedure has successfully completed) or in response to an explicit request.

Once it is determined that cylinder re-activation is required, processing continues at steps 1010 and 1012. As with steps 1004 and 1006, steps 1010 and 1012 are shown in parallel, though, in practice, these steps may be performed substantially simultaneously, or with step 1012 occurring subsequent to step 1010, or with step 1010 occurring subsequent to step 1012, as described below, in order activate the cylinders. At step 1010, the engine controller operates the intake deactivator controller 906 to place the intake deactivators 902 associated with the at least two cylinders in the intake activation state. In the context of the examples of hydraulically-controlled deactivators and solenoids described above, this would be done by the engine controller 930 sending an appropriate signal to de-energize the intake deactivator solenoid 906, thereby causing hydraulic fluid to discontinue flowing to the intake deactivators 902 such that they are locked/un-collapsed. Similarly, at step 1012, the engine controller operates the exhaust deactivator controller 908 to place the exhaust deactivators 904 associated with the at least two cylinders in the exhaust activation state. Once again, in the context of the examples of hydraulically-controlled deactivators and solenoids described above, this would be done by the engine controller 930 sending an appropriate signal to de-energize the intake deactivator solenoid 908, thereby causing hydraulic fluid to discontinue flowing to the exhaust deactivators 904 such that they are locked/un-collapsed.

As noted above, the operations described in steps 1010 and 1012 may be permitted to occur substantially simultaneously or in an ordered fashion. To the extent that the deactivators 902, 904 were placed in their respective deactivation states according to a particular ordering, that ordering is preferably reversed when placing the deactivators 902, 904 in their respective activation states. Although this reverse ordering is particularly desirable in the event that the deactivated cylinders were previously operated to trap gasses when entering the deactivated state (so as to avoid the possibility of attempting to re-open intake valves against significantly high cylinder pressures), this is not necessarily a requirement in the event that the deactivated cylinders were previously operated to trap vacuums (since the intake valves will not encounter high cylinder pressures when re-opening). Regardless, once again, in a presently preferred embodiment, such simultaneous or ordered performance of placing deactivators in their activation state is based on a crankshaft angular range that may be varied depending on the result to be achieved. For example, where the deactivated cylinders in FIG. 9 were operated to trap gasses, the un-collapsing window 602 illustrated in FIG. 6 may be employed. More specifically, the example un-collapsing window 602 illustrated in FIG. 6 extends from approximately 340 degrees crank angle (but, in any case, after start of the main intake event 406) to approximately 120 degrees crank angle (modulo 720 degrees crank angle; but, in any case, before the start of the main exhaust event 404). Provided that respective intake and exhaust deactivator controllers 906, 908 are controlled to initiate the respective activation states anywhere within this window 602, the resulting activation states will be ordered such that exhaust valve actuation motions are re-enabled prior to intake valve actuation motions, thereby avoiding the intake valves from opening against higher cylinder pressures. On the other hand, where the deactivated cylinders in FIG. 9 were operated to trap vacuums, the collapsing window 702 of FIG. 7 may be employed. More specifically, the example collapsing window 702 illustrated in FIG. 7 extends from approximately 130 degrees crank angle (but, in any case, after start of the main exhaust event 404) to approximately 320 degrees crank angle (but, in any case, before the start of the main intake event 406). Provided that respective intake and exhaust deactivator controllers 906, 908 are controlled to initiate the respective deactivation states anywhere within this window 702, the resulting activation states will be ordered such that intake valve actuation motions are re-enabled prior to exhaust valve actuation motions, thereby permitting the intake valve to open against comparatively low cylinder pressures.

As noted previously, although the operations to place deactivators 902, 904 in the deactivation or activation states have been described above as being based on angular ranges of a crankshaft, these determination could instead be based on period of time. That is, for example, after operation of one of the deactivator controllers 906, 908 to place its corresponding deactivators in their deactivation state, a period of time or delay may be employed before operation of the other deactivator controller 906, 908 to place its corresponding deactivators in their deactivation state. However, such periods of time need to take into account the operating speed of the engine (e.g., RPMs) and the response times of the deactivators 902, 904. For example, at comparatively lower engine speeds, the response times of the deactivators 902, 904 may be sufficiently short such that a desired operation can be carried out within the time it takes to complete a single engine cycle, in which case the use of period of time to effectuate delays may be feasible. However, at higher engine speeds, the duration of a single engine cycle may be too short as compared to the response times of the deactivators 902, 904, thus requiring time delays that span multiple engine cycles. Furthermore, other engine operating parameters that may affect the response times of the deactivator controllers 906, 908 may also be accounted for in this manner. For example, it is appreciated that the viscosity of hydraulic fluid (engine oil) is affected by temperature. Consequently, a determination of a suitable period of time to effect a desired ordering may take into account various temperature-related parameters, such as oil temperature or coolant temperature or both. Additionally, oil pressures provide by the hydraulic supply 920 may vary over time, which would clearly affect the response times of the deactivator controllers 906, 908. Thus, a determination of a suitable period of time to effect a desired ordering may take into account the available oil pressure at that time. In short, suitable time periods may be based on any one of the noted engine parameter values, or any desired combination thereof.

Figures 13, 14:
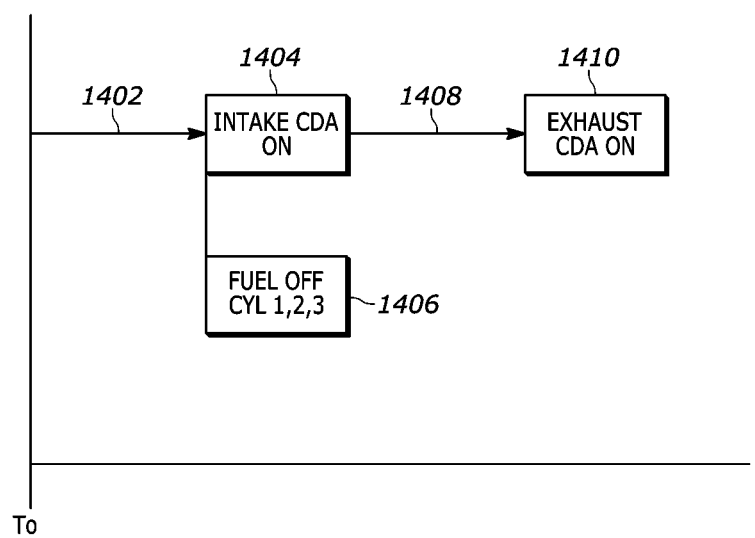
FIG. 13 illustrates an example of a table that may be used to determine response times applicable to deactivator controllers in accordance with the instant disclosure.
FIGS. 14 and 15 illustrate respective techniques for the deactivation and re-activation of cylinders based on a combination of angle-based and time-based timing in accordance with the instant disclosure.

Further still, these parameters are likewise applicable to determinations of suitable angular ranges for effectuating desired operations through the deactivator controllers 906, 908. For example, as engine speed increases, but without faster controller response times, a larger range of crankshaft angles may be required to accommodate the response time of the deactivator controllers. On the other hand, as FIG. 13 illustrates, controller response times to effectuate deactivation decrease with increases in oil pressure and temperature. Consequently, if increased engine speed is accompanied by increased oil pressures and/or temperatures, the decreased controller response times should be taken into account.

In addition to the sequencing of intake and exhaust valve deactivation and activation states for trapped gases and release of such trapped gasses, the issue of partial engagement of the deactivators 902, 904 should also be considered. As noted above, the deactivators 902, 904 are typically hydraulically actuated with mechanical elements moving to lock and unlock the valvetrain. If the pressure rise in hydraulic fluid applied to such a deactivator is timed such that the locking mechanism is only partially moved when the main events begin, there is risk of increased stress on the collapsing members.

Figure 11:
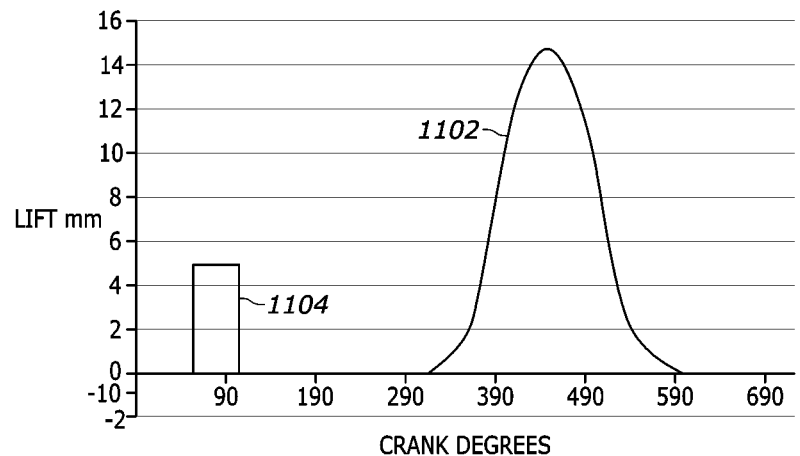
FIGS. 11 and 12 illustrate examples of prohibited crankshaft angular ranges when initiating cylinder deactivation as implemented by the internal combustion engine of FIG. 9.

Typically, there is a window of time where energizing the solenoid would occur when the locking mechanism is in this transition state, and it should be avoided. FIG. 11 illustrates a region 1104 (shown as a rectangular window from approximately 65 to 115 degrees crank angle) where energizing the corresponding deactivator controller could potentially cause a partial locked/unlocked state any associated deactivator. When the loading of the subsequent main valve event 1102 is placed on such a deactivator, there is a chance of a rapid and sudden collapse of the deactivator, which can lead to improper operation or even engine damage. If the deactivator controller is energized closer to the main event (later timing of energizing), the pressure of the hydraulic fluid at the deactivator may not rise enough to unlock the deactivator that, in turn, would not lead to discontinuation of the main event. On the other hand, if the deactivator controller is energized earlier (advanced timing), the hydraulic fluid pressure at the corresponding deactivators will be high enough to unlock such deactivators completely and reliably. Understood in this manner, the region 1104 is understood to be a portion of the crankshaft angular range that should not be used when seeking to place a deactivator in a deactivation state, i.e., operation of the deactivator controller that would fall within this region should be inhibited.

Figure 12:
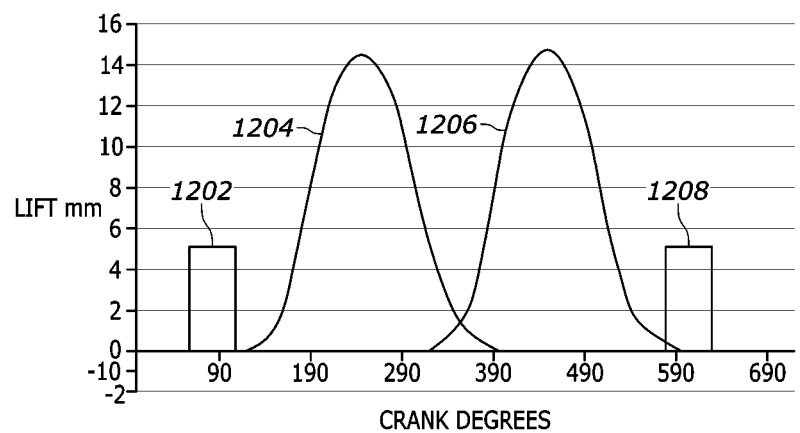

When combining deactivation of intake and the exhaust events, there is a corresponding second region where partial engagement should be avoided to prevent this occurrence on either (intake or exhaust valve) opening event. An example of this is shown in FIG. 12, which illustrates two regions 1202, 1208 where partial engagement can occur (where the first region 1202 is applicable to the illustrated main intake event 1206 and the second region 1208 is applicable to the illustrated main exhaust event 1204). Once again, these regions constitute a portion of a crankshaft angular range where operation of the deactivators 906, 908 should be avoided. If one-to-one correspondence between deactivator controllers and cylinders were provided (as in FIGS. 2 and 3), it would be comparatively simple to achieve activation where partial engagement and sequencing can be controlled by energizing each of the respective deactivators/solenoids in the proper regions. However, a challenge results when combining multiple cylinders on the same deactivator controller where multiple crankshaft angle ranges for proper sequencing may be combined in ways that cause overlap conditions where solenoid energizing needed to meet a desired deactivation ordering may fall with certain prohibited angular ranges. For example, to allow operation with trapped vacuums, the solenoid energize angle range may fall within regions where, at some speeds, there may also be a partial engagement risk. This problem of overlapping crankshaft angle ranges can become particularly acute when it is appreciated that the crankshaft angular ranges (including both desired and forbidden portions) will change as a function of engine speed (or the other engine operating parameters noted above).

Preferably, in order to mitigate the effects of potentially overlapping crankshaft angular regions, a mapping may be provided to determine solenoid response times (and, consequently, whether certain deactivator controller operations may be achieved) for different combinations of operating parameters. For example, to simplify the control strategy, the time response of the solenoid from energizing time to sufficient oil pressure to ensure deactivator collapse can be input into a table of in which pressure rise times are listed in a two-dimensional table indexed according to oil pressure and temperature. And example of this is shown in FIG. 13 where various combinations of oil pressure (y-axis; shown in bar units) and temperature (x-axis; shown in ° C.) correspond to varying pressure rise times. As one would expect, combination of higher oil pressures and temperatures (i.e., the lower, right-hand corner of the illustrated table) correspond to faster rise times to reach sufficient pressures to achieve deactivation. In fact, this also correlates with experience of known deactivation systems that are only permitted to operate during periods of relatively "warm" engine operation, whereas cold oil operation is avoided due to slower response times. Nevertheless, is desirable to provide cold oil cylinder deactivation operation, particularly in diesel engines where cylinder deactivation can be used as part of cold start/engine warmup strategy. However, with very cold oil, available oil pressure may rise so slowly that cylinder deactivation may require a length of time greater than a single engine cycle, as required by angle-based deactivation as described above. To address these conflicting requirements, it is recognized that separate treatment of prohibited angular ranges (to address requirement to avoid potential partial engagements) from permitted angular ranges (to address the desired sequencing requirement) allows deactivation to occur over a larger angle of opportunity, and therefore makes for a more robust system that both avoids partial engagement, and provides proper sequencing with relative ease, and over a more demanding range of operating conditions. For example, for diesel engines that can tolerate trapped vacuums, a combination of angle-based timing (as shown in FIG. 4) can be combined with time-based delays to accommodate the need for deactivation requirements longer than a single engine cycle. As an alternative to a time-based delay, an engine cycle counter (e.g., for every two full rotations of the engine crank shaft) may be employed for this purpose below.

An example of this is illustrated in FIG. 14, in which a grouping of three cylinders (1-3) are being deactivated in accordance with the sequencing provided by FIG. 4. An x-axis in FIG. 14 illustrates the progress of time, starting at $T_0$ when a determination is made to initiate cylinder deactivation for cylinders 1-3. As shown, passage of some amount of time 1402 (or a certain number of engine cycles) occurs until such time that it is determined that the angular range 402 shown in FIG. 4 has begun (which window accounts for any required inhibition range to avoid partial engagements) such that the intake deactivator controller 906 may be operated 1404 to place the corresponding intake deactivators 902 in the intake deactivation state. Substantially simultaneously (i.e., within the tolerances and limits of the engine controller 930 to effectuate such changes at the same time), fuel is cut off 1406 from cylinders 1-3. Thereafter, the engine controller 930 waits for a period of time 1408 (as determined, for example, according to the table in FIG. 13; or, again, based on engine cycles) until the angular requirement of the next occurrence of the collapsing window 402 can be met, at which time the exhaust deactivator controller 908 may be operated 1410 to place the corresponding exhaust deactivators 904 in the exhaust deactivation state. In this manner, the illustrated strategy both avoids the partial engagement scenario and provides a turn on sequence that does not open an intake valve against trapped gas, and traps vacuums in the cylinders during deactivation.

Figure 15:
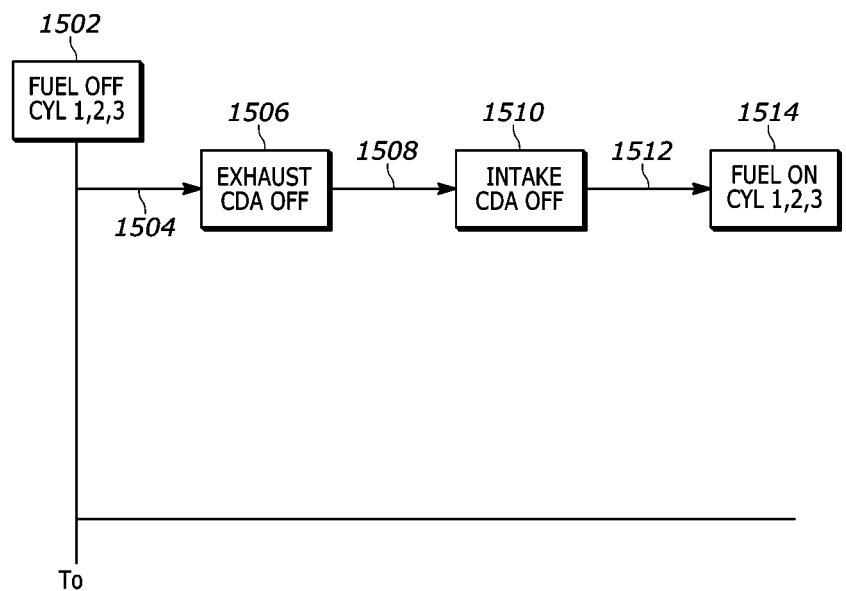

FIG. 15, on the other hand, illustrates the opposite scenario of FIG. 14 in which the grouping of three cylinders are re-activated in accordance with the sequencing illustrated in FIG. 6. As noted previously, this is generally accomplished by reversing the deactivation sequence. In this case, at $T_0$, determination is made to initiate cylinder activation for cylinders 1-3, at which time fuel cut off 1502 for cylinders 1-3 is ensured. As shown, passage of some amount of time 1504 (or engine cycles) occurs until such time that it is determined that the angular range 602 shown in FIG. 6 has begun (which window again accounts for any required inhibition range to avoid partial engagements) such that the exhaust deactivator controller 908 may be operated 1506 to place the corresponding exhaust deactivators 904 in the exhaust deactivation state. Thereafter, the engine controller 930 waits for a period of time 1508 (as determined, for example, according to the table in FIG. 13; or, again, engine cycles) until the angular requirement of the next occurrence of the un-collapsing window 602 can be met, at which time the intake deactivator controller 906 may be operated 1510 to place the corresponding intake deactivators 902 in the intake deactivation state. In this manner, the illustrated strategy prevents potential actuation of intake valves against any trapped gasses and prevents partial engagement of either intake or exhaust deactivators 902, 904. Once both the intake and exhaust deactivators have been switched back to their activation states, another period of time 1512 (or engine cycles) may be allowed to pass, at which time fuel is once again re-introduced 1514 into the now-reactivated cylinders. Substantially simultaneously (i.e., within the tolerances and limits of the engine controller 930 to effectuate such changes at the same time), fuel is cut off 1406 from cylinders 1-3.

As noted above, periods of time to effectuate delays may be replaced by engine cycle counts. In yet another alternative, periods of time may be replaced by ordered angle settings (i.e., collapsing/un-collapsing windows) where one is not allowed to occur until the other has already occurred. For example, angle-based collapsing windows may be set, but where the exhaust collapsing window is not respected until such as the intake collapsing window has occurred and caused the desired intake deactivation. Because the exhaust collapsing window angle will not be reached until the next engine cycle, the same effect as a time based delay may be achieved.

Figure 16:
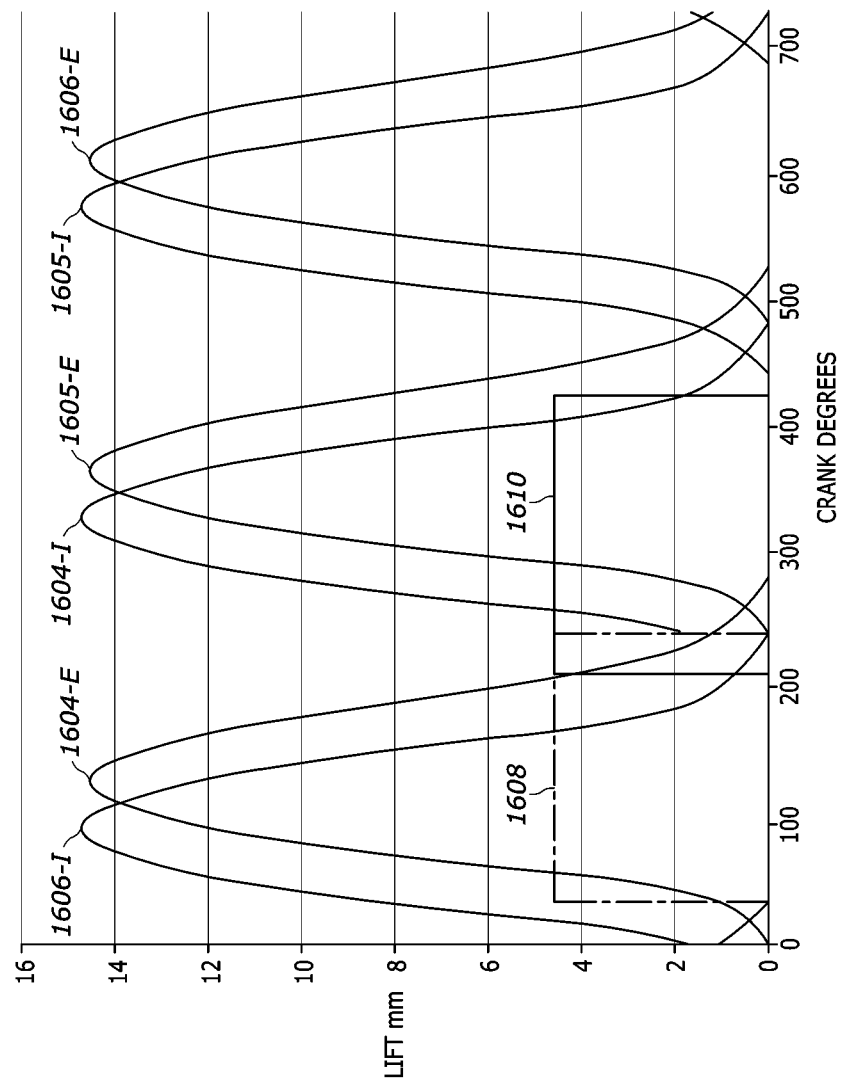
FIG. 16 illustrates examples of windows for the deactivation of cylinders particularly application to an inline, six cylinder engine having a 1-5-3-6-2-4 cylinder firing order in accordance with the instant disclosure.

A typical configuration for diesel engines is an inline, six-cylinder engine having a cylinder firing order of 1-5-3-6-2-4 (according to the generally accepted convention in which the cylinder closest to the front of the engine/vehicle is assigned the lowest number and the cylinder closest to the rear of the engine/vehicle is assigned the highest number). As described above relative to FIG. 3, it is often desirable to address cylinder deactivation by grouping cylinders together, as in the case of a first group comprising cylinders 1-3 and a second group comprising cylinders 4-6. FIG. 16, illustrates examples of exhaust valve lift profiles 1604-E, 1605-E, 1606-E and intake valve lift profiles 1604-I, 1605-I, 1606-I for the fourth through sixth cylinders, respectively, and arranged according to the 1-5-3-6-2-4 firing order. Collapsing windows 1608, 1610 are also shown in FIG. 16, which windows may be used in conjunction with the system of FIG. 9 to achieve trapped gasses in the cylinders. Although FIG. 16 is applicable to the second group of cylinders, those skilled in the art will appreciate that a similar depiction, including appropriately positioned collapsing windows, may also be provided for the first group of cylinders.

The scheme illustrated in FIG. 16 is designed to permit occurrence of intake events for all three cylinders during a first engine cycle, and then prevent occurrence of exhaust and intake events for the next engine cycle (and subsequent cycles for the duration of the deactivation state) to trap gas in the cylinder. Specifically, the engine controller 930 operates (energizes) the exhaust deactivation controller 908 to have an exhaust collapse window 1608 beginning just after the main exhaust event 1604-E for cylinder 4 has started and ending just before the main exhaust event 1605-E for cylinder 5 has started. This will permit the main exhaust event 1604-E for cylinder 4 to occur, and all subsequent main exhaust events 1605-E, 1606-E for cylinders 5 and 6 to be lost by virtue of the relevant deactivators 904 being placed in their respective deactivation states. At this point, both cylinder 5 and cylinder 6 already have gasses therein by virtue of the previously-occurring main intake valve events 1605-I, 1606-I for those cylinders, and the collapse of the deactivators for these cylinders will ensure that such gasses stay trapped therein. Additionally, in the same engine cycle, the engine controller 930 operates (energizes) the intake deactivation controller 906 to have an intake collapse window 1610 beginning just after the main intake event 1604-I for cylinder 4 has started and ending just before the main intake event 1605-I for cylinder 5 has started. This will permit the main intake event 1604-I for cylinder 4 to occur, and all subsequent main intake events 1605-E, 1606-E for cylinders 5 and 6 to be lost by virtue of the relevant deactivators 904 being placed in their respective deactivation states. As a consequence of the permitted main intake valve event 1604-I for cylinder 4, gasses are introduced into cylinder 4 and, because main exhaust events 1604-E for cylinder 4 will have already deactivated, cylinder 4 will trap this additional gas.

More generally, for an inline-six cylinder engine having deactivator controller 906, 908 associated with cylinder groups as described, a 1-5-3-6-2-4 firing order allows timing such that the exhaust deactivator controller can be operated such that a main exhaust event for a selected cylinder in the cylinder group (cylinder 4 in the example of FIG. 16) is not lost and to place the exhaust deactivators for the cylinder group in the exhaust deactivation state such that subsequent main exhaust event for all cylinders are lost. Further, this firing order also permits the intake deactivator controller can be operated such that a main intake event for the selected cylinder in the cylinder group is not lost and to place the intake deactivators for the cylinder group in the intake deactivation state such that subsequent main intake event for all cylinders are lost. In this manner, gasses are trapped in all cylinders in the group despite using only two deactivator controllers for the group of three cylinders.

Because gasses have been trapped in cylinders under the scheme of FIG. 16, transitions from a deactivation state back to an activation state need to ensure un-collapsing/relocking of the exhaust deactivators 904 prior to un-collapsing/relocking of the intake deactivators 902 in order to prevent intake valves opening against high cylinder pressure that was trapped by the above-described deactivation strategy (or trapped by some other means). The timing is roughly the same with the only difference being that the solenoid lag time for turn off may be different than the solenoid lag time to turn on and therefore the compensation should be adjusted to shift the timing to hit the same windows. More specifically, when un-collapsing/relocking, an exhaust un-collapsing window is provided that begins just after the start of a main exhaust event for cylinder X such that cylinder X's main exhaust event does not occur but that will re-enable main exhaust events for the other cylinders. Additionally, an intake un-collapsing window is provided that begins just after the start of a main intake event such that cylinder X's main intake event does not occur but will re-enable main intake events for the other cylinders. This allows the other cylinders to un-collapse/relock in the sequence of exhaust un-collapsing/relocking prior to intake un-collapsing/relocking on all cylinders, and prevents release of cylinder pressure during the intake opening.

Figure 17:
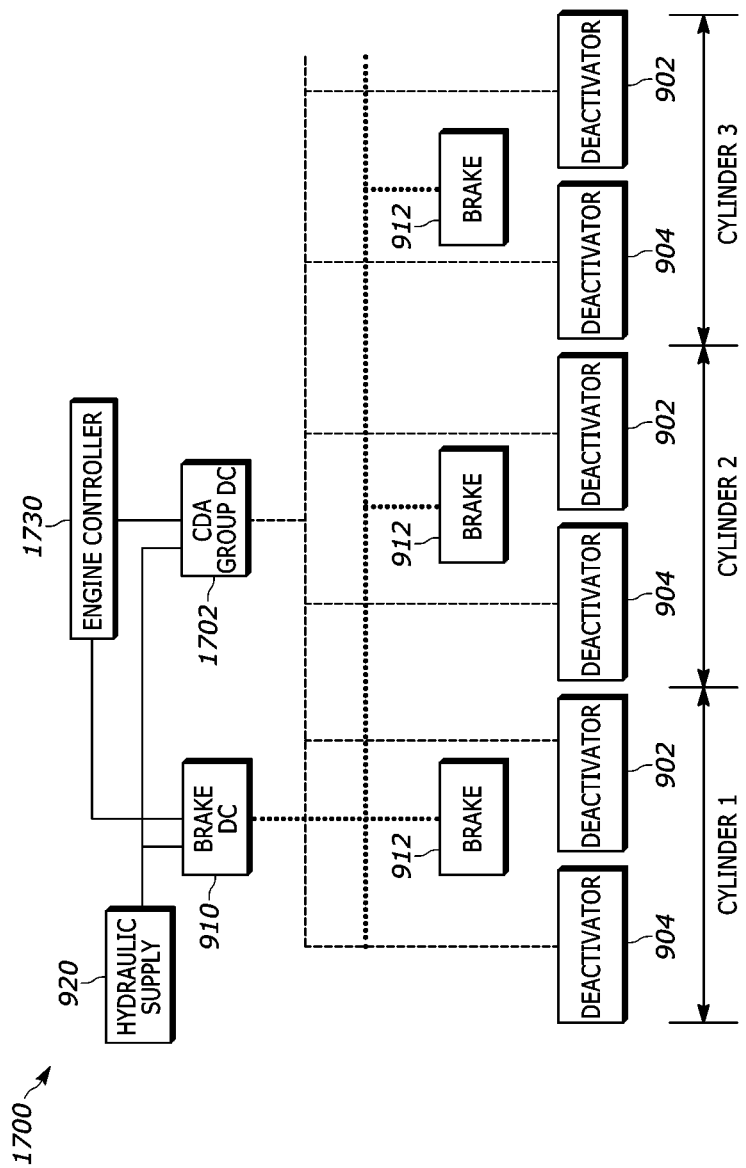
FIG. 17 is a schematic illustration of a second embodiment of an internal combustion engine in accordance with the instant disclosure.

Referring now to FIG. 17, a portion of an internal combustion engine 1700 substantially similar to FIG. 9 is schematically illustrated. In this embodiment, however, only a single deactivator controller 1702 is associated with at least two cylinders (all three in the example of FIG. 17) and is operatively connected to the intake deactivators 902 and exhaust deactivators 904 corresponding to the at least two cylinders. In this manner, even fewer deactivator controllers are required to provide cylinder deactivation operations. Additionally, the engine controller 1730, as described below, operates according to different angle-based control schemes resulting from the modified engine configuration 1700.

For systems that provide 4-stroke engine braking (independent of any intake or exhaust valve disablement) or 2-stroke engine braking (where intake and exhaust valves must be both disabled independent of engine brake operation), a second method of solenoid arrangement and control may be used.

Figure 18:
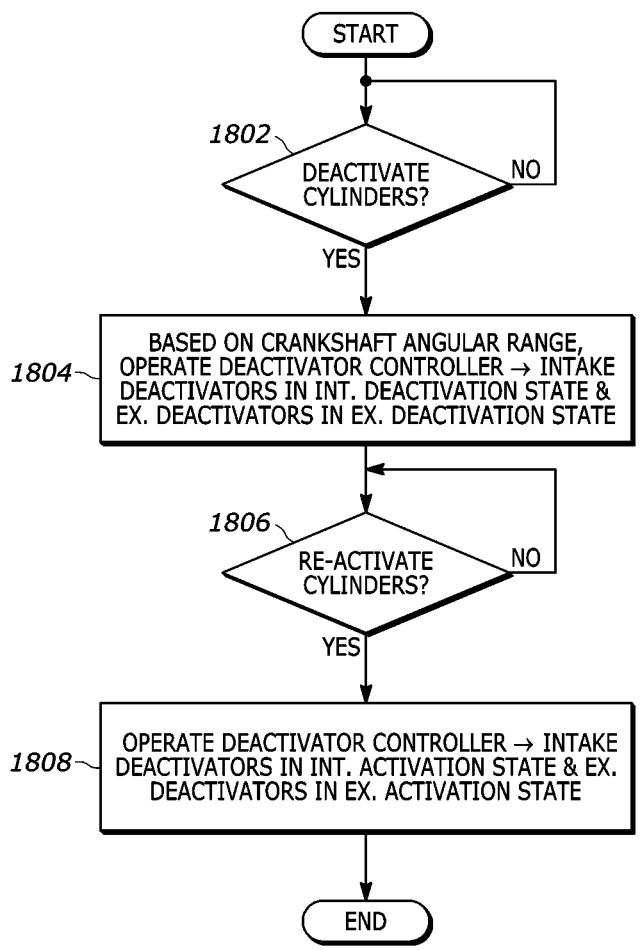
FIG. 18 is a flowchart of processing in accordance with the instant disclosure that may be implemented by the internal combustion engine of FIG. 17.

FIG. 18 illustrates a flow chart of processing for providing cylinder deactivation operation in accordance with the embodiment of FIG. 17. In an embodiment, the processing illustrated in FIG. 18 is performed by the engine controller 1730 and is preferably implemented in the form of executable instructions, stored in one or more memory devices, that are executed by at least one processing device operatively connected to the memory device(s). Regardless, beginning at block 1802, a decision is made (in substantially the same manner as step 1002 from FIG. 10) whether cylinders need to be deactivated.

Figure 19:
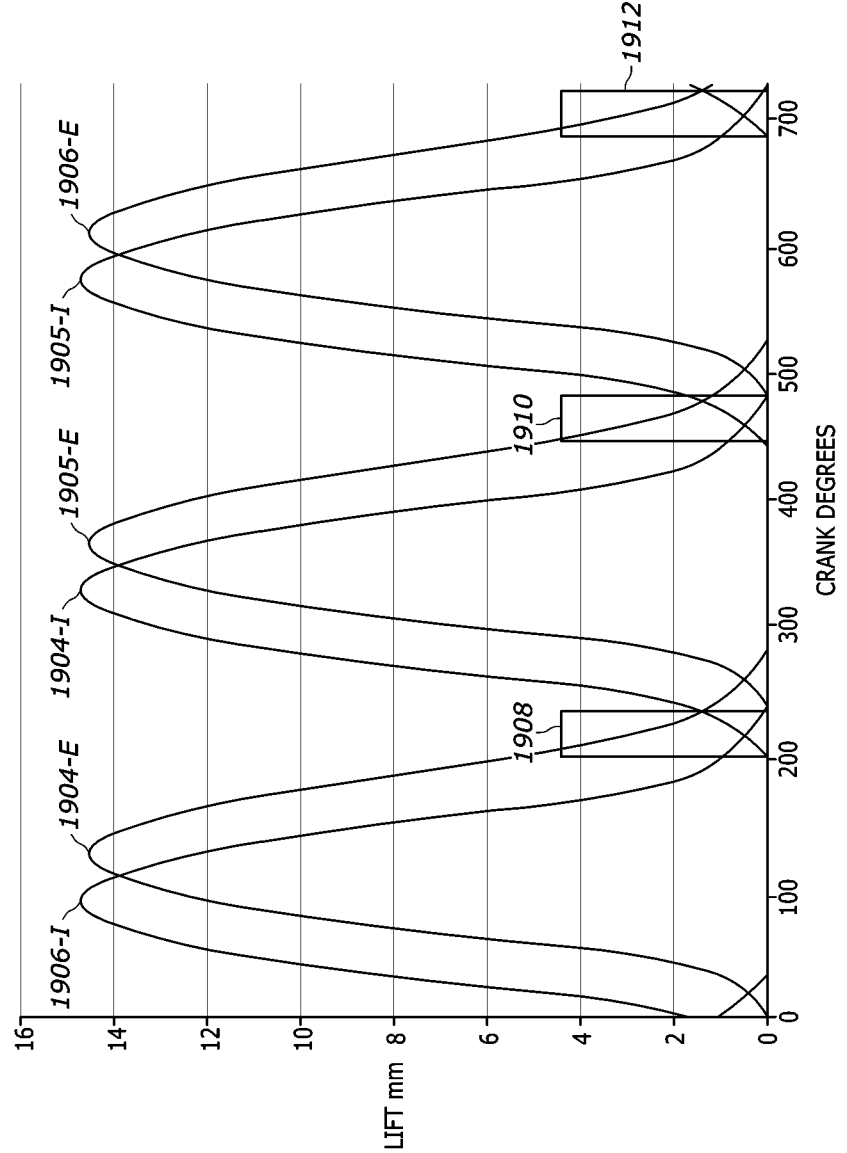
FIG. 19 illustrates examples of windows, which may be implemented by the internal combustion engine of FIG. 17, for the deactivation of cylinders in accordance with an embodiment of the instant disclosure.

Once it is determined that cylinder deactivation is required, processing continues at step 1804, the engine controller 1730 operates the deactivator controller 1702 to place the intake deactivators 902 associated with the at least two cylinders in the intake deactivation state and to place the exhaust deactivators 904 associated with the at least two cylinders in the exhaust deactivation state. Once again, in the context of the examples of hydraulically-controlled deactivators and solenoids described above, this would be done by the engine controller 1730 sending an appropriate signal to energize the deactivator solenoid 1702, thereby causing hydraulic fluid to flow to the intake and exhaust deactivators 902, 904 such that they are unlocked/collapsed. During operation of the deactivator controller 1702 (i.e., energizing the solenoid), timing of the collapsing/unlocking can be arranged such that the intake and exhaust deactivators 902, 904 are placed in their intake and exhaust deactivation states such that all the cylinders to trap residual gasses. An example of this is illustrated in FIG. 19, where, once again, valve lift profiles for main exhaust events 1904-E, 1905-E, 1906-E and main intake events 1904-I, 1905-I, 1906-I for cylinders 4-6 of an inline, six cylinder with 1-5-3-6-2-4 firing order. Additionally, FIG. 19 illustrates collapsing windows 1908, 1910, 1912 to allow collapse/unlocking of exhaust deactivators 904 after the completion of main intake valve events 1904-I, 1905-I, 1906-I for all cylinders. In particular, the first collapsing window 1908 starts after the beginning of the main intake valve event 1904-I for cylinder 4 and ends prior the beginning of the main exhaust valve event 1905-E for cylinder 5; the second collapsing window 1910 starts after the beginning of the main intake valve event 1905-I for cylinder 5 and ends prior the beginning of the main exhaust valve event 1906-E for cylinder 6; and the third collapsing window 1912 starts after the beginning of the main intake valve event 1906-I for cylinder 6 and ends prior the beginning of the main exhaust valve event 1904-E for cylinder 4. It is noted that the illustrated collapsing windows 1908, 1910, 1912 are fairly narrow, i.e., about 25 degrees crank angle in width.

As noted in connection with the embodiment of FIG. 9, systems with grouped cylinders and combined intake and exhaust deactivated controllers for multiple cylinders have added complexity in order to avoid partial engagement windows for each valve lift event that is to be lost. The same holds true for the system of FIG. 17; three cylinders collapsing both intake and exhaust deactivators 902, 904 on a common deactivator controller 1702 have multiple regions to avoid for partial engagement reasons. Achieving deactivator operation with the desired collapsing windows while simultaneously avoiding prohibited partial engagement windows is difficult with a single deactivator controller 1702 controlling three cylinders. For this reason, the system illustrated in FIG. 9 is preferred, notwithstanding the ability to use fewer controller in the embodiment of FIG. 17, due to the comparative ease of achieving the required collapsing windows and avoiding any partial engagement regions.

Referring once again to FIG. 19, once placed in their respective intake and exhaust deactivation states, the intake and exhaust deactivators 902, 904 will continue in this fashion for as long as the deactivator controller 1702 is operated by the engine controller 1730 in this manner and until a switch in its operation occurs. This is reflected at step 1806 where a decision (much like step 1008 in FIG. 10) is made whether to re-activate the cylinders, i.e., to place the deactivators 902, 904 in their respective activation states. Where re-activation is required, processing continues at step 1808 where the deactivator controller 1702 is operated to place the intake deactivators 902 in their intake activation states and to place the exhaust deactivators 904 in their exhaust deactivation states. Generally, this will require the use of un-collapsing windows having similar durations as the collapsing windows 1908, 1910, 1912 shown in FIG. 19 in order to sequence the un-collapsing/relocking of intake valvetrains after the un-collapsing/relocking of exhaust valvetrains to prevent the opening of intake valve against highly pressurized trapped gas. Once again, this is not preferred due to narrow window of opportunity to achieve un-collapse/relock.

In yet another embodiment applicable to the system of FIG. 17, and for engines capable of tolerating vacuums present in deactivated cylinders, the deactivation controller 1702 is operated to provide deactivator sequencing that prevents transient noise and intake valve loading problems, and further prevents partial engagement from occurring. In particular, this strategy provides the ability to trap a vacuum on a selected cylinder during deactivation, while the remaining, unselected cylinders in the cylinder grouping are deactivated such that they trap gasses. An advantage of this strategy is that it permits a broader (and thus more easily achieved) collapsing and un-collapsing windows to be employed as compared to the embodiment described above relative to FIG. 19.

Figure 20:
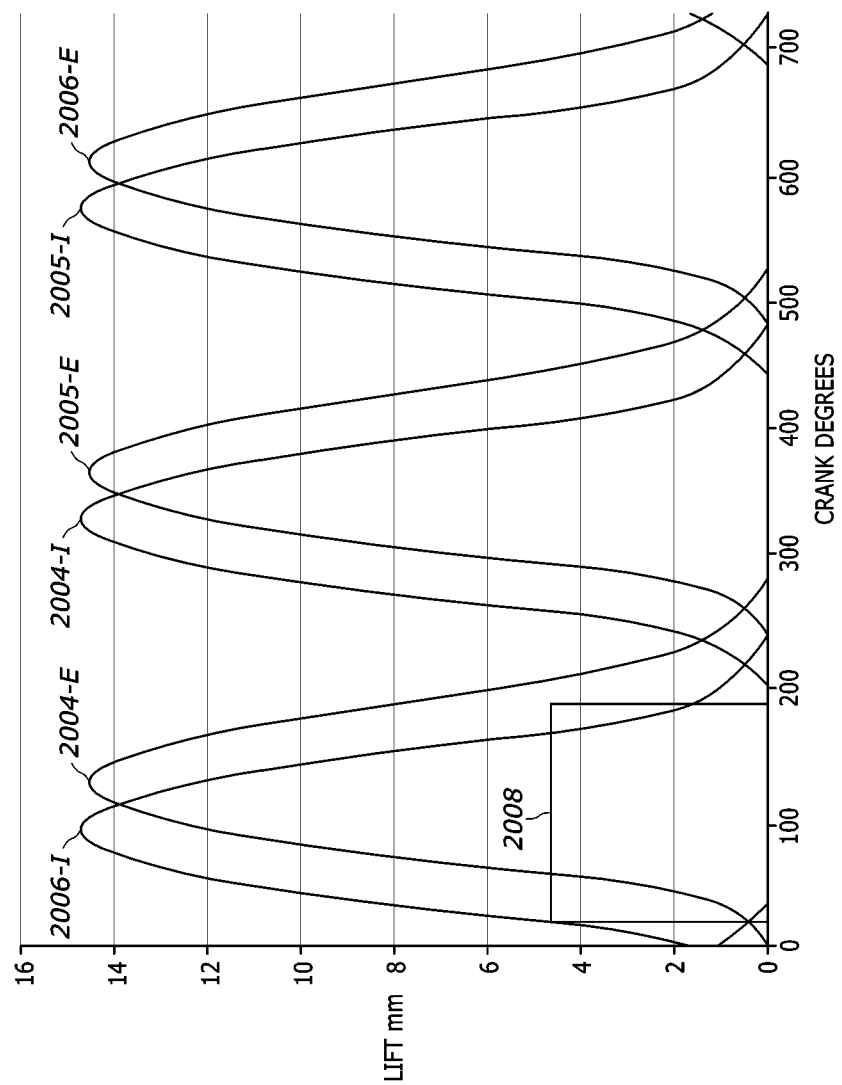
FIGS. 20 and 21 respectively illustrate examples of windows, which may be implemented by the internal combustion engine of FIG. 17, for the deactivation and re-activation of cylinders in accordance with another embodiment of the instant disclosure.

This strategy is illustrated in FIG. 20, which illustrates valve lift profiles for main exhaust events 2004-E, 2005-E, 2006-E and main intake events 2004-I, 2005-I, 2006-I for cylinders 4-6 of an inline, six cylinder engine with 1-5-3-6-2-4 firing order. Additionally, FIG. 20 illustrates a collapsing window 2008 that starts, in this example, after the beginning of the main exhaust valve event 2004-E for cylinder 4 and ends prior the beginning of the main intake valve event 2004-I for cylinder 4. When the deactivator controller 1702 is operated to achieve this collapsing window 2008, cylinder 4 will have main exhaust event 2004-E, but will not subsequently have a main intake event 2004-I. Consequently, cylinder 4 will not have trapped gas (i.e., it will have a trapped vacuum) while in the deactivated state. On the other hand, the intake and exhaust deactivators for cylinder 5 will collapse such that gasses already in cylinder 5 (from the previous engine cycle) will be trapped. The intake deactivators for cylinder 6 will not have collapsed since the main intake event 2006-I for cylinder 6 was already started when the collapsing window 2008 started, thereby permitting gasses to enter cylinder 6. However, thereafter the exhaust deactivator and then the intake deactivator are collapsed in sequence such that cylinder 6 retains its trapped gasses. In short, this strategy operates the cylinder deactivator 1702 such that a main exhaust event for a selected cylinder (cylinder 4 in the above-described example) is not lost and the main intake event for the selected cylinder is lost, while simultaneously allowing the main exhaust and intake valve events for the other (unselected) cylinder in the cylinder group (cylinders 5 and 6 in the above-described example) to be lost.

Figure 21:
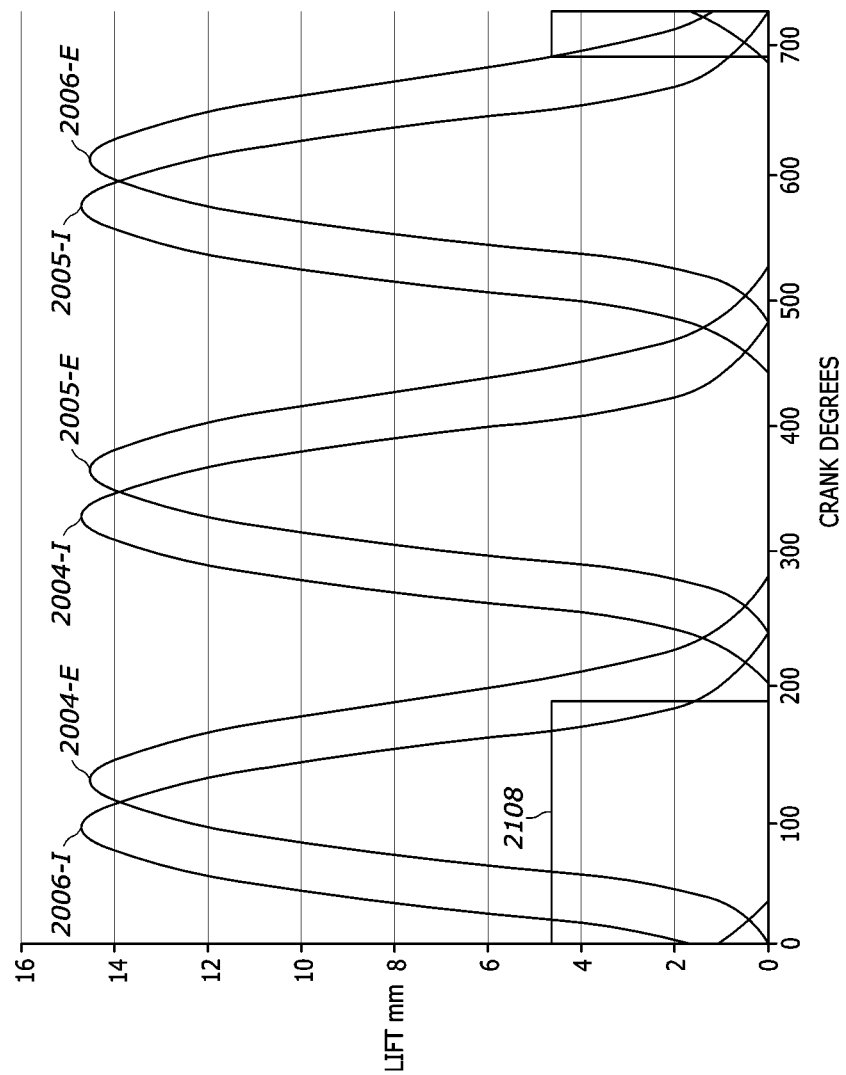

FIG. 21 illustrates the strategy for re-activating cylinders following the de-activation strategy of FIG. 20. In this case, the goal is to ensure that those cylinders that were deactivated to include trapped gasses (cylinders 5 and 6 from the above-described example; the unselected cylinders) are not re-activated such that intake valves for those cylinder are opening against highly pressurized trapped gasses. To this end, the deactivator controller 1702 is operated to place the intake and exhaust deactivators 902 for the cylinder group in the respective intake activation state and exhaust activation state, while also ensuring that main exhaust events for the unselected cylinders occur prior to intake events for the unselected cylinders.

Thus, in the example of FIG. 21, the un-collapsing window 2108 (similar to the collapsing window 2008 in FIG. 20) starts just after the beginning of a main intake event 2006-I for cylinder 6 and ends just before the beginning of the main intake valve event 2004-I for cylinder 4. More time could be available (i.e., a broader window could be used) if needed, however cylinder 4 would have to wait an additional engine cycle before fully returning to an activation state.

For cylinder 4 (the selected cylinder), un-collapsing/relocking may include an occurrence of the main exhaust event 2004-E for cylinder 4, or it may not since cylinder 4 was deactivated with a trapped vacuum. If un-collapsing/relocking is after the main exhaust event 2004-E has started, it will not have an exhaust event, but un-collapsing/relocking of the intake deactivators will permit the main intake vent 2004-I to occur. Again, this would normally be an undesirable condition; however, this cylinder does not have trapped gas, and therefore cannot release gas to create noise or overload the intake valvetrain. On the other hand, if the exhaust deactivators for cylinder 4 do un-collapse/relock such that the main exhaust event 2004-E is permitted to occur, then it will be a normally-desired sequence regardless of trapped gas in that the intake valves for cylinder 4 will not be opened prior to its exhaust valve. Nevertheless, to prevent a partial engagement is it preferred to simply cause the intake valve to open first on the cylinder with the trapped vacuum and avoid any scenarios where the exhaust may or may not un-collapse/relock first. This preferred approach requires a narrower window; however, it the window is sufficiently wide, and avoids any exhaust partial engagement issues.

In turn, cylinder 5 will un-collapse/relock its intake and exhaust deactivators such that the main exhaust event 2005-E for cylinder 5 will occur followed by the main intake event 2005-I. Consequently, no trapped gas will be released through the intake valves for cylinder 5 because it is exhausted before occurrence of the main intake event 2005-I. Cylinder 6 will operate in substantially the same manner as cylinder 5, thereby preventing opening of the intake valves for cylinder 6 against pressurized trapped gasses.

What is claimed is:

1. An internal combustion engine comprising:
a plurality of first through sixth inline cylinders, each of the first through sixth cylinders comprising at least one intake valve and at least one exhaust valve;
a plurality of intake deactivators associated with the plurality of cylinders, wherein, for each cylinder of the plurality of cylinders, at least one intake deactivator of the plurality of intake deactivators is operatively connected to the at least one intake valve and controllable to operate in either an intake activation state in which actuation of the at least one intake valve is permitted or an intake deactivation state in which actuation of the at least one intake valve is not permitted;
a plurality of exhaust deactivators associated with to the plurality of cylinders, wherein, for each cylinder of the plurality of cylinders, at least one exhaust deactivator of the plurality of exhaust deactivators is operatively connected to the at least one exhaust valve and controllable to operate in either an exhaust activation state in which actuation of the at least one exhaust valve is permitted or an exhaust deactivation state in which actuation of the at least one exhaust valve is not permitted;
a plurality of engine braking assemblies associated with the plurality of cylinders, wherein, for each cylinder of the plurality of cylinders, an engine braking assembly of the plurality of engine braking assemblies is selectively operable to provide engine braking operations;
a single intake deactivator controller operatively connected to the intake deactivators associated with a first cylinder group comprising the first through third cylinders or a second cylinder group comprising the fourth through sixth cylinders;
a single exhaust deactivator controller operatively connected to the exhaust deactivators associated with the first cylinder group or the second cylinder group; and
a single engine braking controller operatively connected to engine braking assemblies associated with the first cylinder group or the second cylinder group.

2. The internal combustion engine of claim 1, wherein the plurality of intake deactivators and the plurality of exhaust deactivators are hydraulically-controlled deactivators and the plurality of engine braking assemblies are hydraulically controlled, and wherein the intake deactivator controller, the exhaust deactivator controller and the engine braking controller each comprise a solenoid controlling hydraulic fluid.

3. The internal combustion engine of claim 1, further comprising an engine controller, wherein the engine controller comprises:
at least one processing device; and
memory having stored thereon executable instructions that, when executed by the at least one processing device cause the at least one processing device to:
operate the intake deactivator controller to place the intake deactivators associated with the first cylinder group or the second cylinder group in the intake deactivation state; and
operate the exhaust deactivator controller to place the exhaust deactivators associated with the first cylinder group or the second cylinder group in the exhaust deactivation state.

4. The internal combustion engine of claim 3, wherein those executable instructions that cause the at least one processor to operate the exhaust deactivator controller to place the exhaust deactivators in the exhaust deactivation state are further operative to cause the at least one processor to substantially simultaneously operate the intake deactivator controller to place the intake deactivators in the intake deactivation state.

5. The internal combustion engine of claim 3, wherein those executable instructions that cause the at least one processor to operate the intake deactivator controller to place the intake deactivators in the intake deactivation state are further operative to cause the at least one processor to subsequently operate the exhaust deactivator controller to place the exhaust deactivators in the exhaust deactivation state.

6. The internal combustion engine of claim 5, the memory further comprising executable instructions that, when executed by the at least one processor, cause the at least one processor to operate the exhaust deactivator controller after completion of a period of time subsequent to operating the intake deactivation controller.

7. The internal combustion engine of claim 6, wherein the period of time is based on at least one of engine speed, oil temperature, coolant temperature or oil pressure.

8. The internal combustion engine of claim 5, the memory further comprising executable instructions that, when executed by the at least one processor, cause the at least one processor to operate the intake deactivator controller or the exhaust deactivator controller or both based on an angular range of a crankshaft.

9. The internal combustion engine of claim 8, wherein the angular range is based on at least one of engine speed, oil temperature, coolant temperature or oil pressure.

10. The internal combustion engine of claim 5, the memory further comprising executable instructions that, when executed by the at least one processor, cause the at least one processor to:
   operate the exhaust deactivator controller to place the exhaust deactivators in the exhaust activation state; and
   subsequently operate the intake deactivator controller to control the intake deactivators to discontinue operating in the intake deactivation state.

11. The internal combustion engine of claim 10, the memory further comprising executable instructions that, when executed by the at least one processor, cause the at least one processor to operate the intake deactivator controller or the exhaust deactivator controller or both based on an angular range of a crankshaft.

12. The internal combustion engine of claim 3, wherein those executable instructions that cause the at least one processor to operate the exhaust deactivator controller to place the exhaust deactivators in the exhaust deactivation state are further operative to cause the at least one processor to subsequently operate the intake deactivator controller to place the intake deactivators in the intake deactivation state.

13. The internal combustion engine of claim 12, the memory further comprising executable instructions that, when executed by the at least one processor, cause the at least one processor to operate the intake deactivator controller after completion of a period of time subsequent to operating the exhaust deactivation controller.

14. The internal combustion engine of claim 13, wherein the period of time is based on at least one of engine speed, oil temperature, coolant temperature or oil pressure.

15. The internal combustion engine of claim 12, the memory further comprising executable instructions that, when executed by the at least one processor, cause the at least one processor to operate the intake deactivator controller or the exhaust deactivator controller or both based on an angular range of a crankshaft.

16. The internal combustion engine of claim 15, wherein the angular range is based on at least one of engine speed, oil temperature, coolant temperature or oil pressure.

17. The internal combustion engine of claim 12, the memory further comprising executable instructions that, when executed by the at least one processor, cause the at least one processor to:
   operate the intake deactivator controller to place the intake deactivators in the intake activation state; and
   subsequently operating the exhaust deactivator controller to place the exhaust deactivators in the exhaust activation state.

18. The internal combustion engine of claim 17, the memory further comprising executable instructions that, when executed by the at least one processor, cause the at least one processor to operate the intake deactivator controller or the exhaust deactivator controller or both based on an angular range of a crankshaft.

19. The internal combustion engine of claim 18, wherein the angular range is based on at least one of engine speed, oil temperature, coolant temperature or oil pressure.

20. The internal combustion engine of claim 12, wherein, during positive power operation of the internal combustion engine, the plurality of cylinders are repeatedly fired in order of the first cylinder, then the fifth cylinder, then the third cylinder, then the sixth cylinder, then the second cylinder and then the fourth cylinder,
   the memory further comprising executable instructions that, when executed by the at least one processor, cause the at least one processor to:
   operate the exhaust deactivator controller such that a main exhaust event for a selected cylinder in the first cylinder group or the second cylinder group is not lost and to place the exhaust deactivators for the first cylinder group or the second cylinder group in the exhaust deactivation state; and
   operate the intake deactivator controller such that a main intake event for the selected cylinder in the first cylinder group or the second cylinder group is not lost and to place the intake deactivators for the first cylinder group or the second cylinder group in the intake deactivation state.

21. The internal combustion engine of claim 3, the memory further comprising executable instructions that, when executed by the at least one processor, cause the at least one processor to operate the engine braking controller to, in turn, operate the engine braking assemblies associated with the first cylinder group or the second cylinder group to provide engine braking operations.

22. A method of controlling cylinder deactivation for an internal combustion engine comprising:
   a plurality of first through sixth inline cylinders, each of the first through sixth cylinders comprising at least one intake valve and at least one exhaust valve;
   a plurality of intake deactivators associated with the plurality of cylinders, wherein, for each cylinder of the plurality of cylinders, at least one intake deactivator of the plurality of intake deactivators is operatively connected to the at least one intake valve and controllable to operate in either an intake activation state in which actuation of the at least one intake valve is permitted or an intake deactivation state in which actuation of the at least one intake valve is not permitted;
   a plurality of exhaust deactivators associated with to the plurality of cylinders, wherein, for each cylinder of the plurality of cylinders, at least one exhaust deactivator of the plurality of exhaust deactivators is operatively connected to the at least one exhaust valve and controllable to operate in either an exhaust activation state in which actuation of the at least one exhaust valve is permitted or an exhaust deactivation state in which actuation of the at least one exhaust valve is not permitted;
   a plurality of engine braking assemblies associated with the plurality of cylinders, wherein, for each cylinder of the plurality of cylinders, an engine braking assembly of the plurality of engine braking assemblies is selectively operable to provide engine braking operations;
   a single intake deactivator controller operatively connected to the intake deactivators associated with a first cylinder group comprising the first through third cylinders or a second cylinder group comprising the fourth through sixth cylinders;

a single exhaust deactivator controller operatively connected to the exhaust deactivators associated with the first cylinder group or the second cylinder group;
a single engine braking controller operatively connected to engine braking assemblies associated with the first cylinder group or the second cylinder group;
wherein the method comprises:
operating the intake deactivator controller to place the intake deactivators associated with the first cylinder group or the second cylinder group in the intake deactivation state; and
operating the exhaust deactivator controller to place the exhaust deactivators associated with the first cylinder group or the second cylinder group in the exhaust deactivation state.

23. The method of claim 22, wherein operating the exhaust deactivator controller to place the exhaust deactivators in the exhaust deactivation state is performed substantially simultaneously with operating the intake deactivator controller to place the intake deactivators in the intake deactivation state.

24. The method of claim 22, wherein operating the exhaust deactivator controller to place the exhaust deactivators in the exhaust deactivation state is performed subsequent to operating the intake deactivator controller to place the intake deactivators in the intake deactivation state.

25. The method of claim 24, further comprising operating the exhaust deactivator controller after completion of a period of time subsequent to operating the intake deactivation controller.

26. The method of claim 25, wherein the period of time is based on at least one of engine speed, oil temperature, coolant temperature or oil pressure.

27. The method of claim 24, further comprising operating the intake deactivator controller or the exhaust deactivator controller or both based on an angular range of a crankshaft.

28. The method of claim 27, wherein the angular range is based on at least one of engine speed, oil temperature, coolant temperature or oil pressure.

29. The method of claim 24, further comprising:
operating the exhaust deactivator controller to place the exhaust deactivators in the exhaust activation state; and
subsequently operating the intake deactivator controller to place the intake deactivators in the intake activation state.

30. The method of claim 29, further comprising operating the intake deactivator controller or the exhaust deactivator controller or both based on an angular range of a crankshaft.

31. The method of claim 22, wherein operating the intake deactivator controller to place the intake deactivators in the intake deactivation state is performed subsequent to operating the exhaust deactivator controller to place the exhaust deactivators associated with the at least two cylinders in the exhaust deactivation state.

32. The method of claim 31, further comprising operating the intake deactivator controller after completion of a period of time subsequent to operating the exhaust deactivation controller.

33. The method of claim 32, wherein the period of time is based on at least one of engine speed, oil temperature, coolant temperature or oil pressure.

34. The method of claim 31, further comprising operating the exhaust deactivator controller or the intake deactivator controller or both based on an angular range of a crankshaft.

35. The method of claim 34, wherein the angular range is based on at least one of engine speed, oil temperature, coolant temperature or oil pressure.

36. The method of claim 31, further comprising:
operating the intake deactivator controller to place the intake deactivators in the intake activation state; and
subsequently operating the exhaust deactivator controller to place the exhaust deactivators in the exhaust activation state.

37. The method of claim 36, further comprising operating the intake deactivator controller or the exhaust deactivator controller or both based on an angular range of a crankshaft.

38. The method of claim 37, wherein the angular range is based on at least one of engine speed, oil temperature, coolant temperature or oil pressure.

39. The method of claim 31, wherein, during positive power operation of the internal combustion engine, the plurality of cylinders are repeatedly fired in order of the first cylinder, then the fifth cylinder, then the third cylinder, then the sixth cylinder, then the second cylinder and then the fourth cylinder,
the method further comprising:
operating the exhaust deactivator controller such that a main exhaust event for a selected cylinder in the first cylinder group or the second cylinder group is not lost and to place the exhaust deactivators for the first cylinder group or the second cylinder group to the exhaust deactivation state; and
operating the intake deactivator controller such that a main intake event for the selected cylinder in the first cylinder group or the second cylinder group is not lost and to place the intake deactivators for the first cylinder group or the second cylinder group in the intake deactivation state.

40. The method of claim 22, further comprising:
operating the engine braking controller to, in turn, operate the engine braking assemblies associated with the first cylinder group or the second cylinder group to provide engine braking operations.

41. An internal combustion engine comprising:
a plurality of first through sixth inline cylinders, each of the first through sixth cylinders comprising at least one intake valve and at least one exhaust valve;
a plurality of intake deactivators associated with the plurality of cylinders, wherein, for each cylinder of the plurality of cylinders, at least one intake deactivator of the plurality of intake deactivators is operatively connected to the at least one intake valve and controllable to operate in either an intake activation state in which actuation of the at least one intake valve is permitted or an intake deactivation state in which actuation of the at least one intake valve is not permitted;
a plurality of exhaust deactivators associated with to the plurality of cylinders, wherein, for each cylinder of the plurality of cylinders, at least one exhaust deactivator of the plurality of exhaust deactivators is operatively connected to the at least one exhaust valve and controllable to operate in either an exhaust activation state in which actuation of the at least one exhaust valve is permitted or an exhaust deactivation state in which actuation of the at least one exhaust valve is not permitted;
a plurality of engine braking assemblies associated with the plurality of cylinders, wherein, for each cylinder of the plurality of cylinders, an engine braking assembly of the plurality of engine braking assemblies is selectively operable to provide engine braking operations;
a single deactivator controller operatively connected to the intake deactivators and to the exhaust deactivators associated with a first cylinder group comprising the first through third cylinders or a second cylinder group comprising the fourth through sixth cylinders;

a single engine braking controller operatively connected to engine braking assemblies associated with the first cylinder group or the second cylinder group;

an engine controller comprising at least one processing device and memory having stored thereon executable instructions that, when executed by the at least one processing device cause the at least one processing device to:

operate the deactivator controller, based on an angular range of a crankshaft, to place the intake deactivators associated with the first cylinder group or the second cylinder group in the intake deactivation state and the exhaust deactivators associated with the first cylinder group or the second cylinder group in the exhaust deactivation state.

42. The internal combustion engine of claim 41, the memory further comprising executable instructions that, when executed by the at least one processing device, cause the at least one processing device to:

operate the deactivator controller such that a main exhaust event for a selected cylinder in the first cylinder group or the second cylinder group is not lost and that a main intake event for the selected cylinder in the first cylinder group or the second cylinder group is lost.

43. The internal combustion engine of claim 42, wherein those cylinders of the in the first cylinder group or the second cylinder group other than the selected cylinder are unselected cylinders, and wherein the memory further comprises executable instructions that, when executed by the at least one processing device, cause the at least one processing device to:

operate the deactivator controller to place the intake deactivators associated with the first cylinder group or the second cylinder group in the intake activation state and the exhaust deactivators associated with the first cylinder group or the second cylinder group in the exhaust activation state, and such that main exhaust events for the unselected cylinders occur prior to intake events for the unselected cylinders.

44. The internal combustion engine of claim 41, the memory further comprising executable instructions that, when executed by the at least one processing device, cause the at least one processing device to operate the engine braking controller to, in turn, operate the engine braking assemblies associated with the first cylinder group or the second cylinder group to provide engine braking operations.

45. A method of controlling cylinder deactivation for an internal combustion engine comprising:

a plurality of first through sixth inline cylinders, each of the first through sixth cylinders comprising at least one intake valve and at least one exhaust valve;

a plurality of intake deactivators associated with the plurality of cylinders, wherein, for each cylinder of the plurality of cylinders, at least one intake deactivator of the plurality of intake deactivators is operatively connected to the at least one intake valve and controllable to operate in either an intake activation state in which actuation of the at least one intake valve is permitted or an intake deactivation state in which actuation of the at least one intake valve is not permitted;

a plurality of exhaust deactivators associated with to the plurality of cylinders, wherein, for each cylinder of the plurality of cylinders, at least one exhaust deactivator of the plurality of exhaust deactivators is operatively connected to the at least one exhaust valve and controllable to operate in either an exhaust activation state in which actuation of the at least one exhaust valve is permitted or an exhaust deactivation state in which actuation of the at least one exhaust valve is not permitted;

a plurality of engine braking assemblies associated with the plurality of cylinders, wherein, for each cylinder of the plurality of cylinders, an engine braking assembly of the plurality of engine braking assemblies is selectively operable to provide engine braking operations;

a single deactivator controller operatively connected to the intake deactivators and to the exhaust deactivators associated with a first cylinder group comprising the first through third cylinders or a second cylinder group comprising the fourth through sixth cylinders;

a single engine braking controller operatively connected to engine braking assemblies associated with the first cylinder group or the second cylinder group;

wherein the method comprises:

operating the deactivator controller, based on an angular range of a crankshaft, to place the intake deactivators associated with the first cylinder group or the second cylinder group in the intake deactivation state and the exhaust deactivators associated with the first cylinder group or the second cylinder group in the exhaust deactivation state.

46. The method of claim 45, further comprising:

operating the deactivator controller such that a main exhaust event for a selected cylinder in the first cylinder group or the second cylinder group is not lost and that a main intake event for the selected cylinder in the first cylinder group or the second cylinder group is lost.

47. The method of claim 46, wherein those cylinders in the first cylinder group or the second cylinder group other than the selected cylinder are unselected cylinders, the method further comprising:

operating the deactivator controller to place the intake deactivators associated with the first cylinder group or the second cylinder group in the intake activation state and the exhaust deactivators associated with the first cylinder group or the second cylinder group in the exhaust activation state, and such that main exhaust events for the unselected cylinders occur prior to intake events for the unselected cylinders.

48. The method of claim 45, further comprising:

operating the engine braking controller to, in turn, operate the engine braking assemblies associated with the first cylinder group or the second cylinder group to provide engine braking operations.

* * * * *